US008320709B2

(12) United States Patent
Aratani et al.

(10) Patent No.: US 8,320,709 B2
(45) Date of Patent: Nov. 27, 2012

(54) INFORMATION PROCESSING METHOD AND APPARATUS FOR CALCULATING INFORMATION REGARDING MEASUREMENT TARGET ON THE BASIS OF CAPTURED IMAGES

(75) Inventors: Shinichi Aratani, Ohta-ku (JP); Daisuke Kotake, Yokohama (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 976 days.

(21) Appl. No.: 11/766,573

(22) Filed: Jun. 21, 2007

(65) Prior Publication Data
US 2007/0297695 A1    Dec. 27, 2007

(30) Foreign Application Priority Data

Jun. 23, 2006    (JP) .................................. 2006-173627

(51) Int. Cl.
*G06K 9/36* (2006.01)
(52) U.S. Cl. ........ 382/291; 345/633; 345/634; 348/135; 348/239; 382/103; 382/120; 382/154; 382/190; 600/414; 600/426; 702/151; 702/152; 702/153
(58) Field of Classification Search .................. None
See application file for complete search history.

(56) References Cited

U.S. PATENT DOCUMENTS

| 6,697,761 | B2 * | 2/2004 | Akatsuka et al. ............. 702/151 |
| 6,768,813 | B1 * | 7/2004 | Nakayama ..................... 382/154 |
| 6,792,370 | B2 | 9/2004 | Satoh et al. |
| 7,095,424 | B2 | 8/2006 | Satoh et al. |
| 7,124,053 | B2 * | 10/2006 | Tanaka et al. ................. 702/152 |
| 2002/0052709 | A1 * | 5/2002 | Akatsuka et al. ............. 702/153 |
| 2002/0175994 | A1 * | 11/2002 | Sakakibara et al. ........... 348/135 |
| 2004/0041822 | A1 * | 3/2004 | Iizuka et al. ................... 345/634 |
| 2004/0183926 | A1 * | 9/2004 | Fukuda et al. ................. 348/239 |

(Continued)

FOREIGN PATENT DOCUMENTS
JP    2003-203252 A    7/2003
(Continued)

OTHER PUBLICATIONS

Sato and Tamura, "Fukugo-genjitsukan ni okeru ichiawase shuhou (A review of registration techniques in mixed reality)" Collected Papers I of Meeting on Image Recognition and Understanding (MIRU 2002), Information Processing Society of Japan (IPSJ) Symposium Series, vol. 2002, No. 11, pp. I.61-I.68, 2002.

(Continued)

*Primary Examiner* — Vu Le
*Assistant Examiner* — Tsung-Yin Tsai
(74) *Attorney, Agent, or Firm* — Canon U.S.A., Inc. IP Division

(57) ABSTRACT

From a sequence of images captured by an image pickup unit, images necessary for measuring placement information regarding markers and/or a sensor are automatically determined and obtained. To this end, using position and orientation information regarding the image pickup unit at the time the image pickup unit has captured an obtained image and placement information regarding detected markers, whether to use the captured image corresponding to the position and orientation is determined. Using the captured image determined to be used, the marker placement information, placement information regarding a measurement target, or the position and orientation of the image pickup unit serving as an unknown parameter is obtained so as to minimize the error between the measured image coordinates and theoretical image coordinates of each marker, which are estimated on the basis of a rough value of the parameter.

23 Claims, 20 Drawing Sheets

U.S. PATENT DOCUMENTS

| | | | |
|---|---|---|---|
| 2005/0068293 A1 | 3/2005 | Satoh et al. | |
| 2005/0069174 A1* | 3/2005 | Uchiyama et al. | 382/103 |
| 2005/0253871 A1 | 11/2005 | Anabuki et al. | |
| 2005/0256396 A1* | 11/2005 | Takemoto | 600/414 |
| 2006/0071945 A1* | 4/2006 | Anabuki | 345/633 |
| 2006/0094955 A1* | 5/2006 | Satoh et al. | 600/426 |
| 2006/0120606 A1* | 6/2006 | Furuhashi et al. | 382/190 |
| 2007/0098234 A1* | 5/2007 | Fiala | 382/120 |

FOREIGN PATENT DOCUMENTS

| | | |
|---|---|---|
| JP | 2003-269913 A | 9/2003 |
| JP | 2005-107248 A | 4/2005 |
| JP | 2005-326275 A | 11/2005 |

OTHER PUBLICATIONS

Uchiyama, Yamamoto, and Tamura, "Fukugo-genjitsukan no tame no haiburiddo ichiawase shuhou—6 sensa to bijon shuhou no heiyou-(A robust registration method for meging real and virtual worlds—combining 6 degree of freedom (DOF) sensor and vision algorithm)", Collected Papers of the Virtual Reality Society of Japan, vol. 8, No. 1, pp. 119-125, 2003.

Sato, Uchiyama, and Yamamoto, "UG+B hou: shukan oyobi kyakkan shiten kamera to shisei-sensa wo mochiita ichiawase shuhou (UG+B: A registration framework using subjective and objective view camera and orientation sensor)", Collected Papers of the Virtual Reality Society of Japan, vol. 10, No. 3, pp. 391-400, 2005.

Kotake, Uchiyama, and Yamamoto, "Maka haichi ni kansuru senkenteki chishiki wo riyoushita maka kyaribureishon houhou (A marker calibration method utilizing a priori knowledge on marker arrangement)", Collected Papers of the Virtual Reality Society of Japan, vol. 10, No. 3, pp. 401-410, 2005.

* cited by examiner

INFORMATION PROCESSING METHOD AND APPARATUS FOR CALCULATING INFORMATION REGARDING MEASUREMENT TARGET ON THE BASIS OF CAPTURED IMAGES

BACKGROUND OF THE INVENTION

1. Field of the Invention

The present invention relates to techniques for calculating, using captured images of markers existing in a real space, placement information regarding the markers or a measurement target or a parameter of an image pickup unit.

2. Description of the Related Art

Extensive research has been conducted on the mixed reality (MR) technology that superposes virtual space information (e.g., virtual objects rendered by computer graphics (CG) or text information) on a real space in real time and presents the superposed result to a user. An image display apparatus used in such an MR system is mainly implemented by a video see-through method of superposing an image in a virtual space, which is generated in accordance with the position and orientation of an image pickup device, such as a video camera, on an image in a real space, which is captured by the image pickup device, and rendering and displaying the superposed images.

To enable the user to use the MR system without any uncomfortable feeling, an important factor lies in how accurately the real space is registered with the virtual space. Many measures have been taken to achieve the accurate registration. In general, the registration problem in MR applications eventually leads to the problem of obtaining the position and orientation of the image pickup device relative to a space or an object onto which virtual information is to be superposed.

To solve the problem, registration techniques using markers placed or set in an environment or on an object are disclosed in "*Fukugo-genjitsukan ni okeru ichiawase shuhou* (A review of registration techniques in mixed reality)" by Sato and Tamura, Collected Papers I of Meeting on Image Recognition and Understanding (MIRU 2002), Information Processing Society of Japan (IPSJ) Symposium Series, vol. 2002, no. 11, pp. I.61-I.68, 2002 (hereinafter referred to as "document 1"). In these techniques, the three-dimensional coordinates of each maker are given in advance. The position and orientation of an image pickup device are computed using the relationship between the preliminary-given three-dimensional coordinates of each marker and the image coordinates of each marker within an image captured by the image pickup device.

In "*Fukugo-genjitsukan no tame no haiburiddo ichiawase shuhou-6 jiyudo sensa to bijon shuhou no heiyou*—(A robust registration method for merging real and virtual worlds-combining 6 degree of freedom (DOF) sensor and vision algorithm)" by Uchiyama, Yamamoto, and Tamura, Collected Papers of the Virtual Reality Society of Japan, vol. 8, no. 1, pp. 119-125, 2003 (hereinafter referred to as "document 2"), a hybrid approach utilizing markers and a magnetic or optical 6-DOF position/orientation sensor is disclosed. Although the 6-DOF position/orientation sensor provides measured values in a stable manner, the accuracy is not sufficient in many cases. Therefore, in this method, the position and orientation of an image pickup device, which are obtained from the 6-DOF position/orientation sensor mounted on the image pickup device, are corrected using image information regarding the markers, thereby improving the accuracy.

In "*UG+B hou: shukan oyobi kyakkan shiten kamera to shisei-sensa wo mochiita ichiawase shuhou* (UG+B: A registration framework using subjective and objective view camera and orientation sensor) by Sato, Uchiyama, and Yamamoto, Collected Papers of the Virtual Reality Society of Japan, vol. 10, no. 3, pp. 391-400, 2005 (hereinafter referred to as "document 3"), a 3-DOF orientation sensor is mounted on an image pickup device, and a method of measuring the position and orientation of the image pickup device using image information regarding markers and an orientation value measured by the orientation sensor is disclosed.

In the above-described registration methods using the markers, three-dimensional information regarding the markers (hereinafter referred to as "placement information regarding the markers" or simply as "marker placement information") in a three-dimensional coordinate system serving as a registration reference (hereinafter referred to as a "reference coordinate system") needs to be obtained in advance. The placement information regarding the markers can be manually measured using a ruler, a protractor, a meter, and the like. However, such manual measurement involves many steps but has poor accuracy. Thus, the marker placement information has been obtained in a simple, highly accurate manner using image information.

Placement information regarding markers, each of the markers being represented as the position of a point in a three-dimensional space (hereinafter referred to as "point markers"), can be obtained using a bundle adjustment method. The bundle adjustment method is a method of simultaneously calculating, on the basis of many images captured from various directions, the positions of a group of points in the space and the position and orientation of the image pickup device at the time the image pickup device has captured each of the images. More specifically, the method optimizes the positions of the group of points and the position and orientation of the image pickup device so as to minimize the sum of errors between the observed positions of the points in each of the captured images and the calculated positions of the points in the image, which are calculated on the basis of the positions of the points and the position and orientation of the image pickup device. In contrast, as in the case of a marker with a two-dimensional shape, such as a square marker, whose placement information is represented by the position and orientation in the reference coordinate system (hereinafter referred to as a "two-dimensional marker"), the bundle adjustment method, which is the method of obtaining the positions of the group of points, cannot be applied directly. Therefore, a method of obtaining placement information regarding two-dimensional markers and point markers, which is similar to the known bundle adjustment method, is disclosed in "*Maka haichi ni kansuru senkenteki chishiki wo riyoushita maka kyaribureishon houhou* (A marker calibration method utilizing a priori knowledge on marker arrangement)" by Kotake, Uchiyama, and Yamamoto, Collected Papers of the Virtual Reality Society of Japan, vol. 10, no. 3, pp. 401-410, 2005 (hereinafter referred to as document 4).

In the above-described registration methods using the markers and the 6-DOF position/orientation sensor or the 3-DOF orientation sensor, not only the placement information regarding the markers, but also placement information regarding the sensor must be measured in advance.

For example, in the case that the magnetic 6-DOF position/orientation sensor is used, a transmitter is fixed in the space, and a receiver is mounted on a measurement target (e.g., an image pickup device) to measure the position and orientation of the measurement target. The sensor is configured to measure the 6-DOF position/orientation of the receiver in a coordinate system defined by the transmitter. Thus, to obtain the position and orientation of the measurement target in the reference coordinate system, placement information (that is, the position and orientation) of the transmitter relative to the reference coordinate system and placement information (that is, the position and orientation) of the receiver relative to the measurement target must be measured in advance. Japanese Patent Laid-Open No. 2003-269913 (corresponding to U.S. Pat. No. 6,792,370) discloses a method of obtaining placement information of the sensor using a plurality of images of markers placed in the reference coordinate system, which are captured from various directions. In the case that the 3-DOF orientation sensor is used, the orientation sensor is mounted on a measurement target (e.g., an image pickup device) to measure the orientation of the measurement target. To this end, placement information (that is, the orientation) of the orientation sensor relative to the measurement target needs to be measured in advance. Japanese Patent Laid-Open No. 2005-326275 (corresponding to U.S. Published Application No. 2005/0253871) discloses a method of obtaining the orientation of the sensor relative to the measurement target using a plurality of captured images of markers.

In the related art, many images captured from various directions have been used to measure the placement information regarding the markers for registration and the sensor. Normally, these images are manually captured by the user who decides the image capturing positions. However, such random capturing of the images is insufficient for highly accurate measurement of the placement information. The user must be fully experienced and have enough knowledge. In other words, not everyone can easily measure the placement information.

Since the known measurement of the placement information regarding the markers and the sensor requires time-consuming preparations, the measurement must be conducted before the user experiences the MR system. Therefore, no new markers can be added to expand the moving range while the user is experiencing the MR system. When the marker or sensor placement information changes while the user is experiencing the MR system, no actions can be taken in real time to handle such a change.

SUMMARY OF THE INVENTION

The present invention allows automatic determination and obtaining of images necessary for measuring placement information regarding markers or a sensor from an image sequence captured by an image pickup device, thereby avoiding dependence on user experience or knowledge.

The present invention also allows measurement of placement information regarding markers or a sensor while a user is experiencing an MR system by automatically determining and obtaining images necessary for measuring the placement information regarding the markers or the sensor from an image sequence captured by an image pickup device.

Aspects of the present invention have the following structure.

An information processing method according to an aspect of the present invention is an information processing method of calculating information regarding a measurement target using captured images of markers existing in a real space, including the steps of obtaining an image captured by an image pickup unit; extracting markers from the captured image; obtaining position and orientation information regarding the image pickup unit; determining, on the basis of placement information regarding the markers, which is managed by a marker information management unit, and the position and orientation information regarding the image pickup unit, whether to use the captured image corresponding to the position and orientation information to calculate the information regarding the measurement target; and calculating the information regarding the measurement target using the captured image in the case that it is determined to use the captured image.

An information processing method according to another aspect of the present invention is an information processing method of calculating information regarding a measurement target using captured images of markers existing in a real space, including the steps of obtaining an image captured by an image pickup unit; extracting markers from the captured image; obtaining position and orientation information regarding the image pickup unit; calculating, on the basis of the position and orientation information regarding the image pickup unit, area information regarding an image capturing area in which an image should be captured; and presenting the calculated area information.

An information processing apparatus according to yet another aspect of the present invention is an information processing apparatus for calculating information regarding a measurement target using captured images of markers existing in a real space, including the following elements: a captured image obtaining unit configured to obtain an image captured by an image pickup unit; an extraction unit configured to extract markers from the captured image; a position/orientation information obtaining unit configured to obtain position and orientation information regarding the image pickup unit; a determination unit configured to determine, on the basis of placement information regarding the markers, which is managed by a marker information management unit, and the position and orientation information regarding the image pickup unit, whether to use the captured image corresponding to the position and orientation information to calculate the information regarding the measurement target; and a calculator configured to calculate the information regarding the measurement target using the captured image in the case that the determination unit determines to use the captured image.

An information processing apparatus according to a further aspect of the present invention is an information processing apparatus for calculating information regarding a measurement target using captured images of markers existing in a real space, including the following elements: a captured image obtaining unit configured to obtain an image captured by an image pickup unit; an extraction unit configured to extract markers from the captured image; a position/orientation information obtaining unit configured to obtain position and orientation information regarding the image pickup unit; a calculator configured to calculate, on the basis of the position and orientation information regarding the image pickup unit, area information regarding an image capturing area in which an image should be captured; and a presentation unit configured to present the area information calculated by the calculator.

Further features of the present invention will become apparent from the following description of exemplary embodiments with reference to the attached drawings.

DESCRIPTION OF THE EMBODIMENTS

Preferred exemplary embodiments of the present invention will now herein be described in detail below with reference to the accompanying drawings.

First Exemplary Embodiment

An information processing apparatus according to a first exemplary embodiment calculates, using captured images of markers existing in a real space, placement information regarding the markers.

Figure 1:
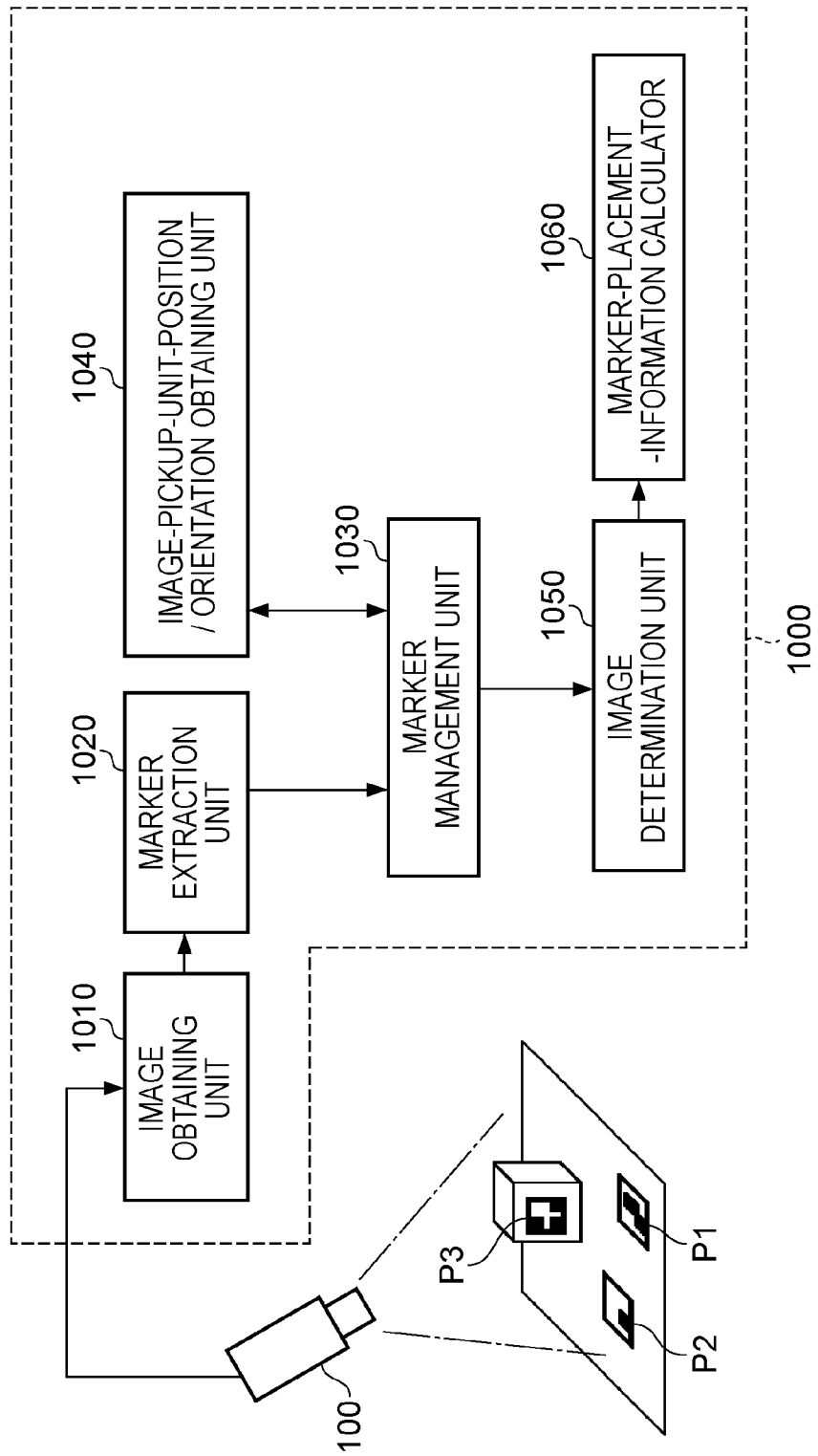
FIG. 1 is a schematic diagram of an exemplary structure of an information processing apparatus according to a first exemplary embodiment of the present invention.

FIG. 1 schematically shows an exemplary structure of an information processing apparatus 1000 configured to calculate placement information regarding markers according to the first embodiment.

The information processing apparatus 1000 is connected to an image pickup unit 100, such as a video camera or the like.

An image obtaining unit 1010 obtains images from the image pickup unit 100. The image pickup unit 100 captures an image of a space or an object on which markers are placed and sequentially outputs a sequence of moving images via the image obtaining unit 1010 to the information processing apparatus 1000. The image obtaining unit 1010 is, for example, a video capture card mounted on a personal computer (PC). Instead of obtaining in real time live images captured by the image pickup unit 100, such as the video camera, the image obtaining unit 1010 may obtain a sequence of images captured in the past, which are stored on a storage device (not shown).

A marker extraction unit 1020 extracts the markers from the obtained image.

The markers used in the first embodiment will now be described below.

Figure 3A:
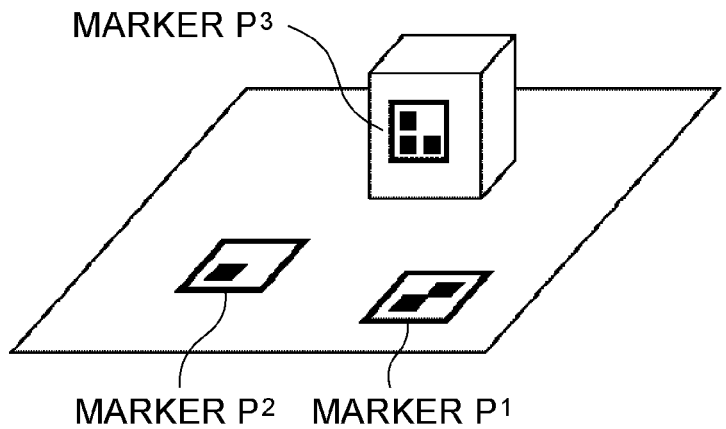
FIG. 3A illustrates an environment where a plurality of markers are placed.
Figure 3B:
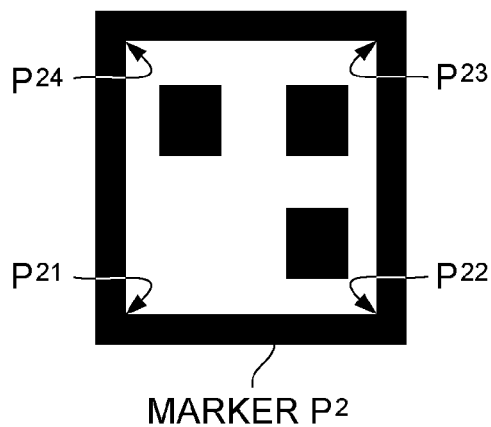
FIG. 3B illustrates a quadrangular marker.

In an environment where the MR can be experienced (hereinafter simply referred to as an "environment") or on an object in the environment, a plurality of four-sided markers (hereinafter referred to as "quadrangular markers") shown in FIG. 3A are placed. Each of the placed markers is represented as $P^k$ (k=1, ..., $K_o$) where $K_o$ is the number of the placed markers ($K_o$=3 in the example shown in FIG. 3A). As shown in FIG. 3B, each quadrangular marker has an internal pattern representing its identifier. From the identifier, each quadrangular marker can be uniquely identified. Each quadrangular marker $P^k$ has vertices $p^{ki}$ (i=1, ..., $N_k$) where $N_k$ is the number of vertices constituting the marker $P^k$ (since the markers in the first embodiment are quadrangular, $N_k$=4).

The marker extraction unit 1020 performs the labeling after binarizing a captured image and extracts, from a region having an area larger than or equal to a predetermined area, an area defined by four straight lines as a marker candidate area. It is then determined whether the candidate area is a marker area by determining whether the candidate area contains a specific pattern. In the case that the candidate area is determined as a marker area, the internal pattern of the marker area is read to obtain the direction of the marker within the image and the identifier of the marker, thereby extracting the marker from the obtained image.

The marker $P^k$ placed in the environment or on the object is not limited to a quadrangular marker. The marker $P^k$ can have any shape as long as it is detectable and identifiable in the captured image.

Figure 3C:
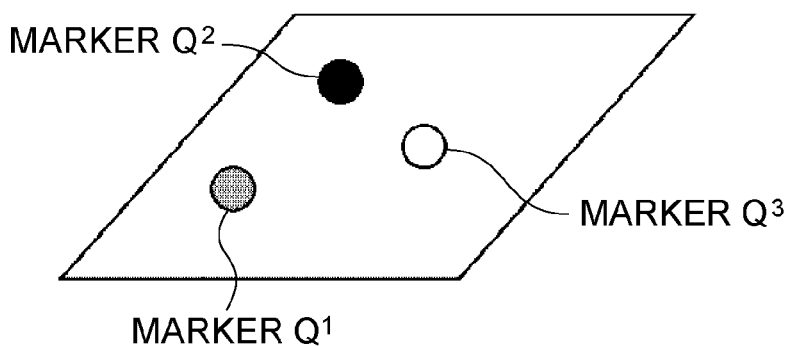
FIG. 3C illustrates circular markers.

For example, as shown in FIG. 3C, circular point markers having different colors may be used. In this case, an area corresponding to each of the marker colors is detected in an image, and the barycentric position thereof is determined as the detected coordinates of the markers. Alternatively, feature points (natural feature points) that originally exist in the space and have different texture features may serve as markers. In this case, the markers are extracted from an image by applying a template matching to the image to detect any matches to marker template images stored in advance as known information.

The markers are not limited to those described above and can be of any type or shape as long as they are fixed in the space and detectable in the captured image.

A marker management unit 1030 manages, regarding the markers extracted by the marker extraction unit 1020, the identifier $k_n$ of each quadrangular marker $P^{kn}$, the image coordinates $u_{Pkni}$ of each vertex $p^{kni}$ of each marker $P_{kn}$, and placement information regarding each marker $P^{kn}$ as marker information. The placement information regarding each marker indicates the position and orientation of the marker relative to a reference coordinate system in the case that the marker is a quadrangular marker and indicates the position of the marker relative to the reference coordinate system in the case that the marker is a point marker.

The reference coordinate system is defined on the basis of a point in the environment or on the object, the point serving as the origin, and three axes orthogonal to one another are defined as an X-axis, a Y-axis, and a Z-axis, respectively. In the first embodiment, a marker whose placement information in the reference coordinate system is known is referred to as a "reference marker". Images are captured such that a reference marker is included in at least one of the images.

An image-pickup-unit-position/orientation obtaining unit 1040 obtains the rough position and orientation of the image pickup unit 100 at the time the image pickup unit 100 has captured each image.

An image determination unit 1050 determines whether to use the image obtained by the image obtaining unit 1010 to calculate placement information regarding each marker.

Using the image determined by the image determination unit 1050 to be used, a marker-placement-information calculator 1060 calculates placement information regarding each marker.

Figure 2:
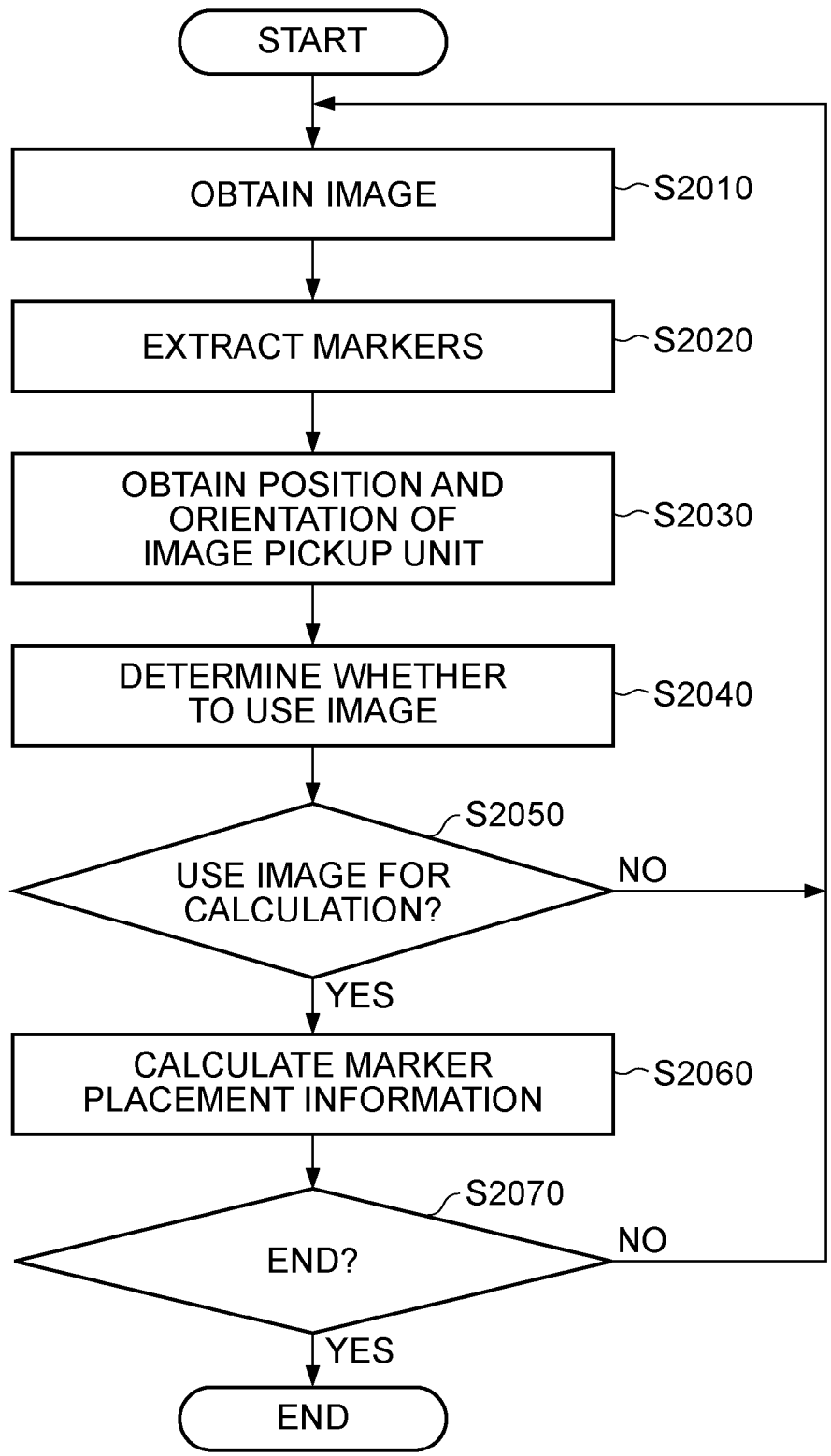
FIG. 2 is a flowchart of a process performed by the information processing apparatus according to the first embodiment.

Next, a process of calculating the marker placement information according to the first embodiment will be described below with reference to the flowchart shown in FIG. 2.

In step S2010, the image obtaining unit 1010 obtains an image currently being captured by the image pickup unit 100.

In step S2020, the marker extraction unit 1020 extracts markers from the image obtained by the image obtaining unit 1010 and registers the identifier $k_n$ of each extracted quadrangular marker $P^{kn}$ and the image coordinates $u^{Pkni}$ of each vertex $p^{kni}$ in the marker management unit 1030 where n (n=1, . . . , N) is an index corresponding to each of the quadrangular markers detected in the image, and N indicates the total of the detected quadrangular markers.

Also, $N_{Total}$ is the total of the vertices of N quadrangular markers extracted from the image. In the example shown in FIG. 3A, an image of a quadrangular marker with one identifier, a quadrangular marker with two identifiers, and a quadrangular markers with three identifiers is captured, where N=3. The identifiers $k_1=1$, $K_2=2$, and $K_3=3$ and corresponding image coordinates $u^{Pk1i}$, $u^{Pk2i}$, and $u^{Pk3i}$ (i=1, 2, 3, and 4) are registered in the marker management unit 1030. In this case, $N_{Total}$ is 12 (=3×4).

In step S2030, the image-pickup-unit-position/orientation obtaining unit 1040 obtains the rough position and orientation information of the image pickup unit 100 at the time the image pickup unit 100 has captured the image currently being calculated. In the first embodiment, the rough position and orientation of the image pickup unit 100 are obtained, using a known method, from image information regarding markers whose placement information in the reference coordinate system is known. For example, in the case that markers detected in the image are not coplanar in the space, a direct linear transformation (DLT) method is used to obtain the position and orientation of the image pickup unit 100. In the case that the detected markers are coplanar, a method using the plane homography is used to obtain the position and orientation of the image pickup unit 100. These methods of obtaining the position and orientation of the image pickup unit 100 on the basis of the relationship between the image coordinates and the three-dimensional coordinates of a plurality of points are well known in fields of photogrammetry and computer vision, and hence detailed descriptions thereof are omitted to avoid redundancy.

The method of obtaining the position and orientation of the image pickup unit 100 is not limited to the above-described methods. Alternatively, for example, a magnetic, ultrasonic, or optical 6-DOF position/orientation sensor is mounted on the image pickup unit 100, and an output value of the sensor may be used as the rough position and orientation of the image pickup unit 100. Alternatively, as described in document 3, the rough position and orientation of the image pickup unit 100 may be obtained using a 3-DOF orientation sensor and markers. Alternatively, any other known techniques may be used to obtain the rough position and orientation of the image pickup unit 100.

Figure 4:
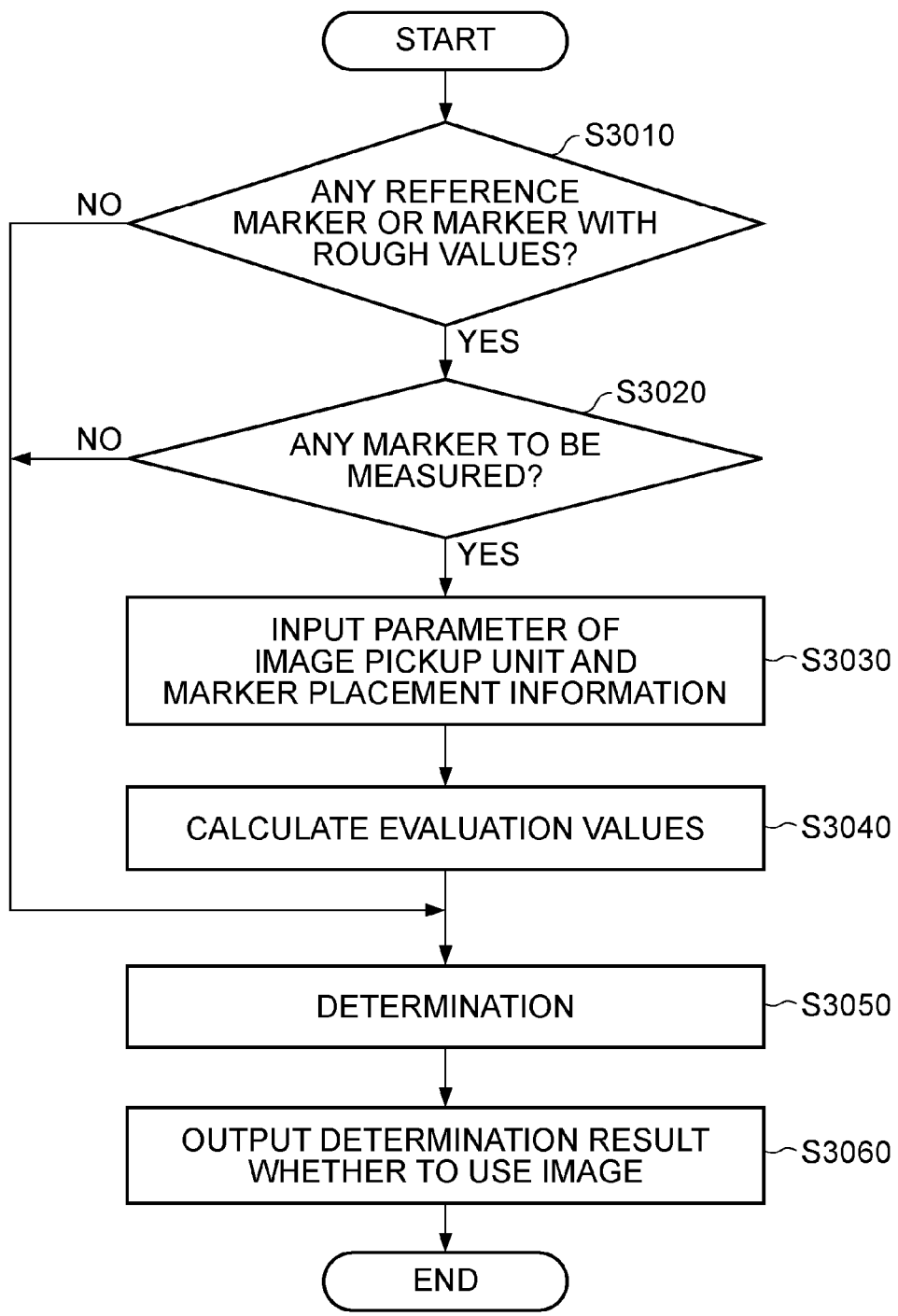
FIG. 4 is a flowchart of a process performed by an image determination unit according to the first embodiment.

In step S2040, evaluation values are computed. In step S2050, it is determined on the basis of the evaluation values whether to use the image obtained by the image obtaining unit 1010 to calculate placement information regarding each marker. FIG. 4 is a flowchart of the procedure performed in steps S2040 and S2050 to determine whether the image is necessary for calculating placement information regarding each marker.

In step S3010, it is determined whether a reference marker is detected in the obtained image, or whether a marker with rough placement information in the reference coordinate system is detected in the image. The reference marker may be defined as a polygonal marker, such as a rectangular marker, whose size detected in the image is known, or as at least three point markers that are not collinear and that have a known relative positional relationship. Rough placement information regarding a quadrangular marker other than the reference marker can be obtained by calculating the plane homography on the basis of the rough position and orientation of the image pickup unit 100 at the time the image pickup unit 100 has captured an image of the marker and the position of each vertex in the image. In the case that the marker is a point marker, the rough position of the marker can be obtained by a stereographic method using two captured images in which the rough positions and orientations of the image pickup unit 100 at the time the image pickup unit 100 has captured the images are known.

In the case that no reference marker or no marker with rough placement information is detected in the image, it is determined in step S3050 that this image will not be used.

In step S3020, it is determined whether a marker to be measured (serving as a measurement target) other than the reference marker is detected. In the case that no marker serving as a measurement target is detected, it is determined in step S3050 that this image will not be used.

In step S3030, the marker information managed by the marker management unit 1030 and the position and orientation of the image pickup unit 100, which are obtained by the image-pickup-unit-position/orientation obtaining unit 1040, are input to the image determination unit 1050. In step S3040, evaluation values for determining whether to use the image to calculate the marker placement information are calculated. A method of calculating the evaluation values will now be described.

Figure 5:
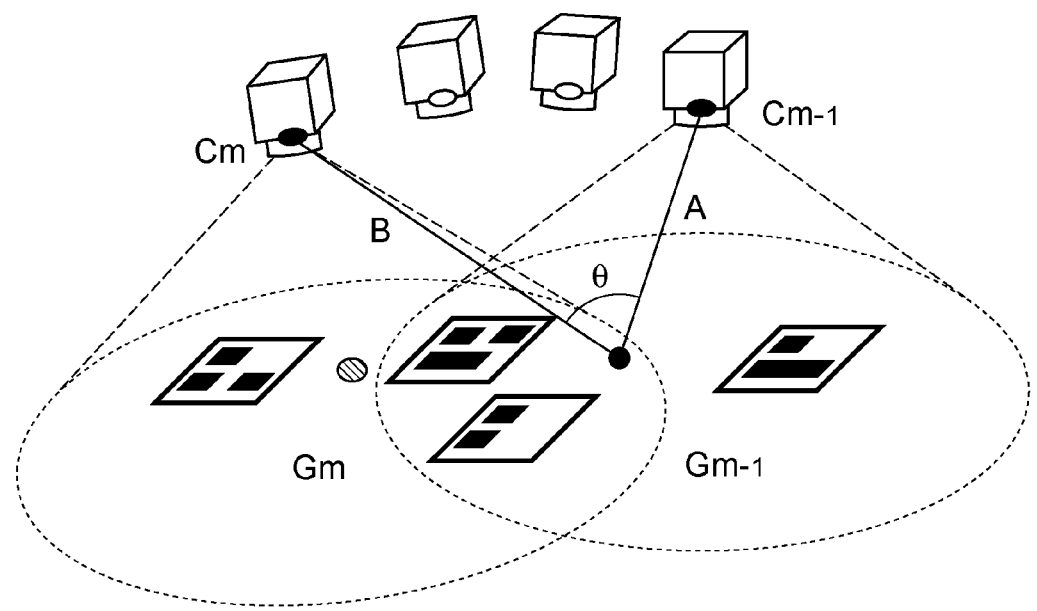
FIG. 5 illustrates calculation of evaluation values according to the first embodiment.

FIG. 5 illustrates a method of obtaining the evaluation values for determining whether to use an obtained image for measurement.

Prior to this calculation, images determined to be used for measurement are numbered frame numbers 1, 2, m−1, and it is then determined whether to use the obtained image as an m-th frame. The position of the image pickup unit 100 at the time the image pickup unit 100 has captured the currently obtained image is $C_m=[C_{mx}\ C_{my}\ C_{mz}]^t$. The barycentric position in the reference coordinate system is $G_m=[G_{mx}\ G_{my}\ G_{mz}]$ $t$, which is obtained from placement information regarding a group of markers detected in the image obtained in the m-th frame.

Given a vector $\vec{A}$ extending from the position $C_{m-1}$ of the image pickup unit 100 at the time the image pickup unit 100 has captured the (m−1)-th frame to the barycentric position $G_{m-1}$ of the marker group detected in the (m−1)-th frame, and a vector $\vec{B}$ extending from the position $C_m$ of the image pickup unit 100 at the time the image pickup unit 100 has captured the currently obtained image to the barycentric position $G_{m-1}$. The angle $\theta_{AB}$ defined by $\vec{A}$ and $\vec{B}$ is calculated:

$$\theta_{AB} = \arccos \frac{\vec{A} - \vec{B}}{|\vec{A}| - |\vec{B}|} \quad (1\text{-}1)$$

The obtained angle $\theta_{AB}$ serves as a first evaluation value. Next, the magnitude ratio between $\vec{A}$ and $\vec{B}$ is calculated:

$$\alpha = \frac{|\vec{B}|}{|\vec{A}|} (\text{where } |\vec{A}| > |\vec{B}|) \quad (1\text{-}2)$$

$$\alpha = \frac{|\vec{A}|}{|\vec{B}|} (\text{where } |\vec{A}| < |\vec{B}|)$$

The obtained α serves as a second evaluation value.

In step S3050, whether to use the obtained image is determined on the basis of the obtained evaluation values.

In the case that the first evaluation value $\theta_{AB}$ satisfies the following:

$$\theta_{AB} > \theta_{TAB} \quad (1\text{-}3)$$

it is determined that there is a sufficiently great parallax between the (m−1)-th frame and the currently obtained image, and it is thus determined to use the obtained image as the m-th frame for calculation. In expression (1-3), $\theta_{TAB}$ is a preset threshold value. The fact that the evaluation value $\theta_{AB}$ exceeds the threshold $\theta_{TAB}$ means that the images of the detected marker group have been captured at different viewpoints in the m-th frame and in the (m−1)-th frame. The threshold $\theta_{TAB}$ may be changed to any value in accordance with the distribution of the markers in the three-dimensional space or in the environment where the markers are placed. For example, in the case that the markers are placed in a room in which the image capturing range is limited, $\theta_{TAB}$ is set to a relatively small value. In the case that $\theta_{TAB}$ is set to a small value, however, the parallax becomes small, and hence, the accuracy of the measurement result is reduced. To prevent the accuracy of the measurement result from degrading, the number of images used may be increased, or a high-resolution camera may be used.

In the case that the condition in expression (1-3) is not satisfied, a determination is performed on the basis of the second evaluation value α.

In the case that the second evaluation value α satisfies the following:

$$\alpha < \alpha_{T1} \text{ or } \alpha_{T2} < \alpha \text{ (where } \alpha_{T1} < \alpha_{T2}) \quad (1\text{-}4)$$

it is determined to use the obtained image as the m-th frame for calculation. Otherwise, the obtained image will not be used. In expressions (1-4), $\alpha_{T1}$ and $\alpha_{T2}$ are preset thresholds.

The fact that the second evaluation value satisfies the above condition means that the image capturing distance to the detected marker group differs between the m-th frame and the (m−1)-th frame.

In step S3060, the determination result obtained in step S3050 whether to use the image or not is output.

Referring back to FIG. 2, in step 2050, if it is determined in step S3050 to use the currently obtained image and if the number m of images determined to be used to calculate the marker placement information satisfies the following:

$$m \geq 2 \quad (1\text{-}5)$$

then, the flow proceeds to step S2060. Otherwise (if it is determined in step S2040 that the image will not be used or if the number m of images does not satisfy expression (1-5)), the flow returns to step S2010, and a new image is obtained.

In step S2060, information regarding the images to be used for calculation is used to calculate the marker placement information.

Figure 6:
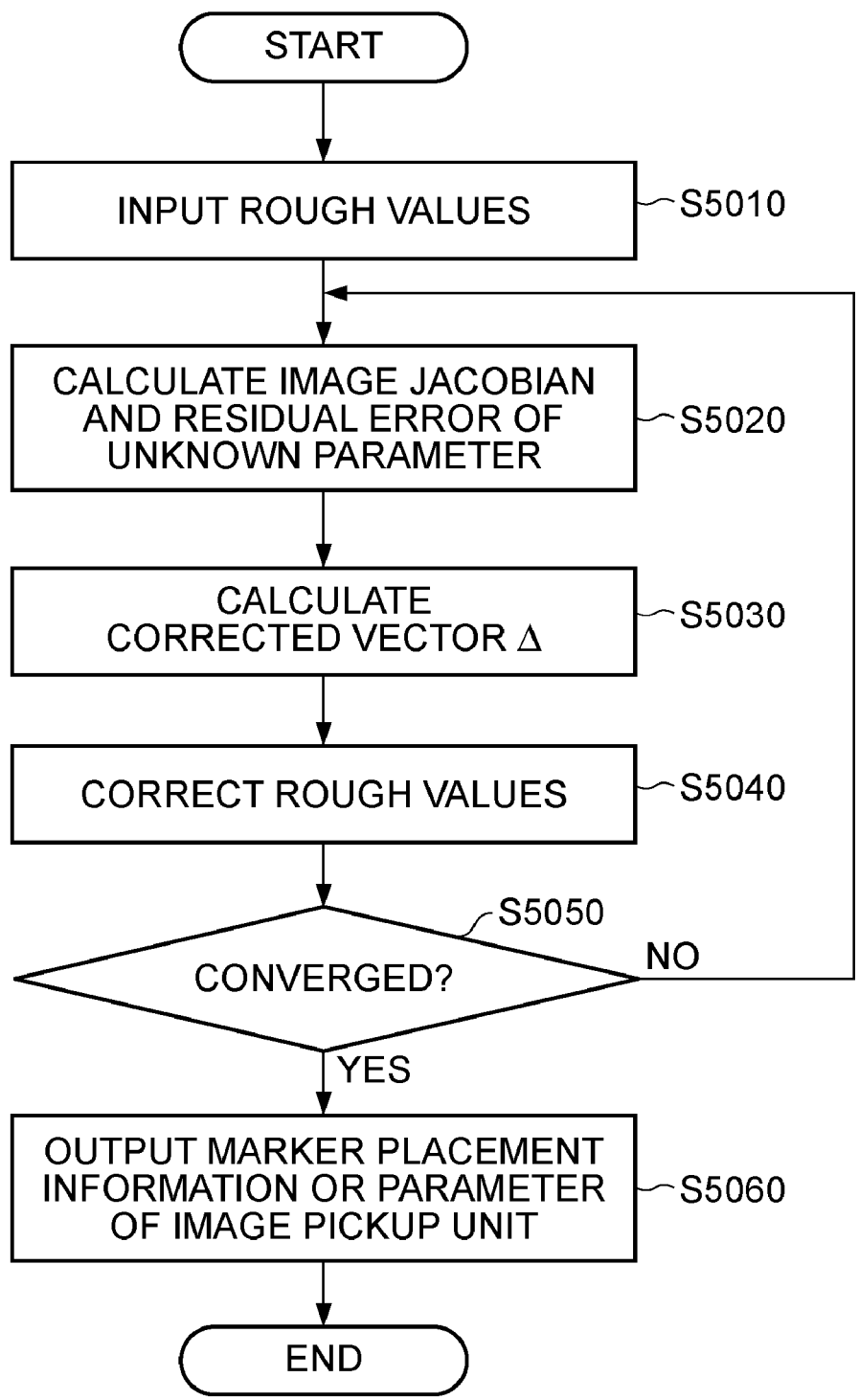
FIG. 6 is a flowchart of a process of obtaining placement information regarding the markers or the position and orientation of an image pickup unit.

A process of calculating the marker placement information in step S2060 will now be described. FIG. 6 shows the process of calculating the marker placement information.

In step S5010, the rough position and orientation of the image pickup unit 100 at the time the image pickup unit 100 has captured each of the images, which have been obtained by the above-described method, and the rough placement information regarding each rectangular marker serving as a measurement target are input.

In step S5020, the error (residual error) between the detected position of the marker in the image and the calculated position of the marker in the image, which is calculated on the basis of the rough position and orientation of the image pickup unit 100 and the rough placement information regarding the marker, is calculated.

Given $u = [u_x \, u_y]^t$ representing the projected position of the marker on the image, a vector s representing the position and orientation of the image pickup unit 100, and a vector a representing the marker placement information, then the following holds true:

$$u = F(s, a) \quad (1\text{-}6)$$

where F is a function including a viewing transform, which is a transform from the reference coordinate system to a camera coordinate system, and a perspective projection transform. Given $t = [t_x \, t_y \, t_z]^t$ representing the position of the image pickup unit 100 in the reference coordinate system, and $\omega = [\omega_x \, \omega_y \, \omega_z]^t$ representing the orientation of the image pickup unit 100, then the vector s representing the position and orientation of the image pickup unit 100 is $s = [t_x \, t_y \, t_z \, \omega_x \, \omega_y \, \omega_z]^t$. In this case, the vector a is a three-dimensional vector in the case that the marker only has position information and is a six-dimensional vector in the case that the marker has position and orientation information. The orientation in the three-dimensional space is represented by a 3×3 rotation transform matrix. Since the degree of rotational freedom is only three, the orientation can be represented by the three-dimensional vector ω.

In this case, ω employs a 3-DOF orientation representation method and represents the orientation using a rotation axis vector and a rotation angle. Given a rotation angle $r_a$, $r_a$ can be expressed in terms of ω:

$$r_a = \sqrt{\omega_x^2 + \omega_y^2 + \omega_z^2} \quad (1\text{-}7)$$

Given a rotation axis vector $r_{axis} = [r_x \, r_y \, r_z]t$, the relationship between $r_{axis}$ and ω can be expressed:

$$[\omega_x \omega_y \omega_z] = [r_a r_x \, r_a r_y \, r_a r_z] \quad (1\text{-}8)$$

The relationship between ω (rotation angle $r_a$ and rotation axis vector $r_{axis}$) and the 3×3 rotation transform matrix R can be expressed:

$$R = \begin{bmatrix} R_{11} & R_{12} & R_{13} \\ R_{21} & R_{22} & R_{23} \\ R_{31} & R_{32} & R_{33} \end{bmatrix} \quad (1\text{-}9)$$

$$= \begin{bmatrix} r_x^2(1-\cos r_a) + \cos r_a & r_x r_y(1-\cos r_a) - r_z \sin r_a & r_z r_x(1-\cos r_a) + r_y \sin r_a \\ r_x r_y(1-\cos r_a) + r_z \sin r_a & r_y^2(1-\cos r_a) + \cos r_a & r_y r_z(1-\cos r_a) - r_x \sin r_a \\ r_z r_x(1-\cos r_a) - r_y \sin r_a & r_y r_z(1-\cos r_a) + r_x \sin r_a & r_z^2(1-\cos r_a) + \cos r_a \end{bmatrix}$$

Let $\hat{u}$ be the detected coordinates of the marker in the image. Then, the error between u and $\hat{u}$ is calculated:

$$\Delta u = \hat{u} - u \quad (1\text{-}10)$$

In step S5030, a corrected form of the vector s representing the position and orientation of the image pickup unit 100 and a corrected form of the vector a representing the marker placement information are calculated such that the error $\Delta u$ calculated in step S5020 is minimized. The error $\Delta u$ can be expressed by first-order approximation using a vector $\Delta s$ for correcting the vector s and a vector $\Delta a$ for correcting the vector a:

$$\Delta u \approx \begin{bmatrix} \dfrac{\partial u}{\partial s} & \dfrac{\partial u}{\partial a} \end{bmatrix} \begin{bmatrix} \Delta s \\ \Delta a \end{bmatrix} \quad (1\text{-}11)$$

where $$\begin{bmatrix} \dfrac{\partial u}{\partial s} & \dfrac{\partial u}{\partial a} \end{bmatrix}$$

is referred to as a Jacobian matrix (or an image Jacobian). Since a specific method of calculating a Jacobian matrix is known and described in document 4, a detailed description thereof is omitted to avoid redundancy.

Expression (1-11) is a relational expression regarding a point (a vertex in the case of a quadrangular marker) in an image. In the case that there are m images determined to be used for calculation, and that the marker has q vertices, then the following is derived:

$$\Delta u \approx \begin{bmatrix} \dfrac{\partial u}{\partial s_1} & \cdots & \dfrac{\partial u}{\partial s_m} & \dfrac{\partial u}{\partial a_1} & \cdots & \dfrac{\partial u}{\partial a_q} \end{bmatrix} \begin{bmatrix} \Delta s_1 \\ \vdots \\ \Delta s_m \\ \Delta a_1 \\ \vdots \\ \Delta a_q \end{bmatrix} \quad (1\text{-}12)$$

which can be simplified as:

$$\Delta u \approx J_w \Delta t, \quad (1\text{-}13)$$

$$\left( \text{where } J_w = \begin{bmatrix} \dfrac{\partial u}{\partial s_1} & \cdots & \dfrac{\partial u}{\partial s_m} & \dfrac{\partial u}{\partial a_1} & \cdots & \dfrac{\partial u}{\partial a_q} \end{bmatrix} \right)$$

In the case that the number of vertices of all the markers detected in the images selected to be used for calculation is n, then the following is obtained:

$$\begin{bmatrix} \Delta u_1 \\ \Delta u_2 \\ \vdots \\ \Delta u_n \end{bmatrix} \approx \begin{bmatrix} J_{w1} \\ J_{w2} \\ \vdots \\ J_{wn} \end{bmatrix} \Delta t \quad (1\text{-}14)$$

The unknown parameter $\Delta t$ to be calculated is obtained by a least squares method in the following manner:

$$\Delta t = \begin{bmatrix} J_{w1} \\ J_{w2} \\ \vdots \\ J_{wn} \end{bmatrix}^{+} \begin{bmatrix} \Delta u_1 \\ \Delta u_2 \\ \vdots \\ \Delta u_n \end{bmatrix} \quad (1\text{-}15)$$

where + represents a pseudo-inverse matrix.

The calculation of $\Delta t$ using equation (1-15) is equivalent to solving a redundant system of linear equations relative to an unknown value of the corrected vector $\Delta t$. Therefore, instead of calculating the pseudo-inverse matrix, a different method of solving the system of linear equations, such as a sweeping-out method, a Gauss-Jordan iteration method, or a conjugate gradient method, may be used to solve the system of linear equations. In the case that the number of obtained images or the number of detected markers is large, $\Delta t$ can be calculated at a high speed by a preconditioned conjugate gradient method of performing incomplete Cholesky decomposition as preprocessing.

In step S5040, using the obtained $\Delta t$, the following are corrected:

$$s_i(1 \leq i \leq m) \text{ and } a_j(1 \leq j \leq q)$$

In step S5050, whether the calculation has converged or not is determined using a determination reference, such as whether $\Sigma \Delta u$ is less than a preset threshold or whether the corrected $\Delta t$ is less than a preset threshold. If the calculation has not converged, the corrected state vectors s and a serve as initial values, and the flow returns to step S5020. The processing from step S5020 to step S5040 is repeated.

If it is determined that the calculation has converged, in step S5060, the marker placement information or the position and orientation of the image pickup unit 100 are output.

As has been described above, whether to use a captured image for measurement is automatically determined using the rough placement information regarding each marker detected in the image and the evaluation values calculated on the basis of the rough position and orientation of the image pickup unit 100 at the time the image pickup unit 100 has captured the image. Accordingly, many images captured from various directions, which are needed for highly accurate measurement of the marker placement information, can be obtained without requiring experiences or knowledge.

Modification 1-1

In the first embodiment, the first evaluation value is obtained using the vector $\vec{A}$ extending from the position $C_{m-1}$ of the image pickup unit 100 at the time the image pickup unit 100 has captured the (m−1)-th frame to the barycentric position $G_{m-1}$ of the marker group detected in the (m−1)-th frame, and the vector $\vec{B}$ extending from the position $C_m$ of the image pickup unit 100 at the time the image pickup unit 100 has captured the obtained image to the barycentric position $G_{m-1}$. Alternatively, instead of using a simple barycenter as $G_{m-1}$, the barycentric position weighted in accordance with the marker detection result may serve as $G_{m-1}$.

The barycentric position is obtained to take into consideration the distance to each marker serving as a measurement target. In image-based measurement such as stereographic measurement, the measurement accuracy is affected by the distance to a measurement target and the distance between image capturing positions. If, for example, among the detected markers, one marker is exceptionally far away or nearby, the representative position of measurement targets is significantly affected by the exceptional marker. To reduce the effect, the exceptional marker is excluded, or the barycenter calculation is calculated by weighting this exceptional marker less.

The distance $1i$ (i=1, 2, ..., N) between the rough position of each of the markers detected in the (m−1)-th frame and the rough image capturing position of the image pickup unit 100 at the time the image pickup unit 100 has captured the (m−1)-th frame is obtained, where N is the total of the markers detected in the (m−1)-th frame. In the barycenter calculation, the weighted barycentric position $G_{m-1}$ is obtained by applying less weight to the exceptional marker. The weight can be calculated using, for example, a Tukey function, which is often used in M-estimation, which is a robust estimation method. In the Tukey function, using a threshold c obtained on the basis of the distance $1_i$ (i=1, 2, ..., N) and the standard deviation of the distance $1_i$, a weight $W_i$ is computed:

$$W_i = \left(1 - \left(\frac{l_i}{c}\right)^2\right)^2, \quad (1\text{-}16)$$

if $|l_i| \leq c$ $W_i = 0$, if $|l_i| > c$

Given the position $t_i$ (i=1, 2, ..., N) of each marker detected in the (m−1)-th frame, the weighted barycentric position $G_{m-1}$ is obtained:

$$G_{m-1} = \frac{1}{N}\sum_{1}^{N} t_i W_i \quad (1\text{-}17)$$

Modification 1-2

The marker placement information or the position and orientation of the image pickup unit 100 have been obtained in the first embodiment. In contrast, an internal parameter of the image pickup unit 100 may be calculated as a measurement target.

Given a focal length f, coordinates $(u_0, v_0)$ at the center of the image, scale factors $k_u$ and $k_v$ in the u and v directions, and a shear coefficient $k_s$, an internal parameter of the image pickup unit 100, which serves as an unknown parameter, is:

$$A = \begin{bmatrix} fk_u & fk_s & u_0 \\ 0 & fk_v & v_0 \\ 0 & 0 & 1 \end{bmatrix} \quad (1\text{-}18)$$

where A is a matrix for transforming a point in the camera coordinate system to the image coordinates u.

Whether to use an obtained image for measurement can be determined by a method similar to that used in the first embodiment. An internal parameter of the image pickup unit 100 serves as an unknown parameter, and a parameter that minimizes the error between the measured image coordinates of each marker and the theoretical image coordinates of the marker calculated from an estimated parameter value is obtained by non-linear optimization. In this case, the rough internal parameter of the image pickup unit 100 is set in advance on the basis of a design parameter or the like.

Modification 1-3

In the first embodiment, the first evaluation value $\theta_{AB}$ is obtained from the vector $\vec{A}$ extending from the position $C_{m-1}$ of the image pickup unit 100 at the time the image pickup unit 100 has captured the (m−1)-th frame to the barycentric position $G_{m-1}$ of the marker group detected in the (m−1)-th frame and the vector $\vec{B}$ extending from the position $C_m$ of the image pickup unit 100 at the time the image pickup unit 100 has captured the obtained image to the barycentric position $G_{m-1}$.

However, the first evaluation value need not be obtained only on the basis of the (m−1)-th frame and the obtained image. Let $\vec{A}$ be a vector extending from the barycentric position $G_m$ of the marker group detected in the obtained image to the position $C_m$ of the image pickup unit 100 at the time the image pickup unit 100 has captured the obtained image. Also, images each including markers with the same identifiers as those of the markers detected in the obtained image are extracted from the first to (m−1)-th frames. Given the total Q of the extracted images and a vector $\vec{B}_q$ extending from the barycentric position Gm of the marker group detected in the obtained image to a position $C_q$ of the image pickup unit 100 at the time the image pickup unit 100 has captured a q-th frame (q=1, 2, ..., Q). The first evaluation value is:

$$\theta_{AB_q} = \arccos \frac{\vec{A} \cdot \vec{B}_q}{|\vec{A}| \cdot |\vec{B}_q|} \quad (1\text{-}19)$$

In the case that, for all q, the first evaluation value $\theta_{ABq}$ satisfies the following:

$$\theta_{ABq} > \theta_{TAB} \quad (1\text{-}20)$$

then, it is determined that the obtained image will be used for calculation. Otherwise, the obtained image will not be used for calculation. In expression (1-20), $\theta_{TAB}$ is a preset threshold. The fact that the evaluation value $\theta_{ABq}$ exceeds the threshold $\theta_{TAB}$ means that images of the detected marker group have been captured at different viewpoints in the m-th frame and the q-th fame. The threshold $\theta_{TAB}$ may be changed to any value in accordance with the distribution of the markers or the environment where the markers are placed.

By performing determination using such an evaluation value, an image captured at a viewpoint different from those of all the images detected to be used can be automatically selected.

Modification 1-4

In the first embodiment, among the images to be used, images captured by the image pickup unit 100 at the same position and orientation are not excluded or updated. However, images captured by the image pickup unit 100 at the same position and orientation are unnecessary since they have no information for improving the accuracy of measuring the marker placement information. Therefore, images captured by the image pickup unit 100 at the same position and orientation should be excluded or updated. A process of excluding or updating images captured at substantially the same position and orientation will now be described below.

Given a vector $\vec{C}$ extending from the position $C_m$ of the image pickup unit 100 at the time the image pickup unit 100 has captured the currently obtained image to the barycentric position $G_m$ obtained from placement information regarding each marker in the marker group detected in the obtained image, and vectors $\vec{D}_1, \vec{D}_2, \ldots,$ and $\vec{D}_{m-1}$ extending from the positions $C_1, C_2, \ldots,$ and $C_{m-1}$ of the image pickup unit 100 at the times the image pickup unit 100 has captured images that have already been determined to be used to the barycentric position $G_m$. Angles $\theta_{CD1}, \theta_{CD2}, \ldots,$ and $\theta_{CDm-1}$ defined by the vector $\vec{C}$ and the vectors $\vec{D}_1, \vec{D}_2, \ldots,$ and $\vec{D}_{m-1}$ are calculated:

$$\theta_{CDi} = \arccos\frac{\vec{C} \cdot \vec{D}_i}{|\vec{C}| \cdot |\vec{D}_i|}, \quad (i=1, 2, \cdots m-1) \quad (1\text{-}21)$$

The ratio $\beta_i$ of the vector $\vec{C}$ to each of the vectors $\vec{D}_1$, $D_2, \ldots,$ and $\vec{D}_{m-1}$ is calculated:

$$\beta_i = \frac{|\vec{D}_i|}{|\vec{C}|}, \quad (i=1, 2, \cdots m-1) \quad (1\text{-}22)$$

In the case that $\theta_{CDi}$ satisfies the following:

$$\theta_{TCD} < \theta_{CDi} \quad (1\text{-}23)$$

where $i=1, 2, \ldots, m-1$, and $\beta$ satisfies the following:

$$\beta_{T1L} \leq \beta_i \leq \beta_{T2L} \quad (1\text{-}24)$$

then, it is determined that the currently obtained image is captured at substantially the same viewpoint position as that of the image(s) that have already been determined to be used, and that frame serves as a j-th frame (j=1, 2, ..., J) where J is the total of images determined to be captured at the same viewpoint position. In expressions (1-23) and (1-24), $\theta_{TCD}$, $\beta_{T1L}$, and $\beta_{T2L}$ are preset thresholds.

Next, whether the currently obtained image has been captured with the same orientation as that of the image(s) that have already been determined to be used is determined. The angular difference $\theta_{mj}$ between a visual axis vector $t_m$ of the image pickup unit 100 at the time the image pickup unit 100 has captured the obtained image and a visual axis vector $t_j$ in the j-th frame determined to be captured at the same viewpoint position is calculated:

$$\theta_{mj} = \arccos\frac{\vec{t}_m \cdot \vec{t}_j}{|\vec{t}_m| \cdot |\vec{t}_j|}, \quad (j=1, 2, \cdots J) \quad (1\text{-}25)$$

The angular difference $\theta_{mj}$ serves as a third evaluation value.

Next, the rotation angular difference around the visual axis is calculated. Let a vector $v_m$ orthogonal to the visual axis vector be a vector $t_y=[0\ 1\ 0]^t$ in the y-axis direction in the camera coordinate system. The vector $v_m$ is transformed into the reference coordinate system using a 3×3 rotation transform matrix $R_m$ representing the rough orientation of the image pickup unit 100:

$$v_m = R_m \cdot t_y \quad (1\text{-}26)$$

Similarly, let a vector $v_j$ orthogonal to the visual axis vector in the j-th frame determined to have been captured at the same viewpoint position be a vector $t_y=[0\ 1\ 0]^t$ in the y-axis direction in the camera coordinate system. The vector $v_j$ is transformed into the reference coordinate system:

$$v_j = R_j \cdot t_y \quad (1\text{-}27)$$

The angular difference between $v_m$ and $v_j$, that is, the rotation angular difference $\gamma_{mj}$ around the visual axis, is calculated:

$$\gamma_{mj} = \arccos\frac{\vec{v}_m \cdot \vec{v}_j}{|\vec{v}_m| \cdot |\vec{v}_j|} \quad (1\text{-}28)$$

The rotation angular difference $\gamma_{mj}$ (j=1, 2, ..., J) around the visual axis serves as a fourth evaluation value.

On the basis of the third and fourth evaluation values obtained in the above manner, it is determined whether the image has been captured with substantially the same orientation, thereby determining whether to use the image for measurement or not.

In the case that the third evaluation value $\theta_{mj}$ satisfies the following:

$$\theta_{mj} < \theta_{Tmj} (j=1, 2, \ldots, N) \quad (1\text{-}29)$$

then, it means that the obtained image has already been captured in the j-th frame from the same viewpoint position and with the same orientation. Thus, the image will not be used.

In contrast, in the case that the third evaluation value does not satisfy the condition in expression (1-29), it is then determined on the basis of the fourth evaluation value whether to use the image.

In the case that the fourth evaluation value $\gamma_{mj}$ satisfies the following:

$$\gamma_{mj} > \gamma_{Tmj} \quad (1\text{-}30)$$

then, the obtained image has been captured from the same viewpoint position and with the same orientation, but the image has been captured by rotating the image pickup unit 100 around the visual axis. Thus, the image is determined to be used for measurement. Otherwise, the image is determined not to be used. In expression (1-30), $\gamma_{Tmj}$ is a preset threshold.

Even in the case of an image determined in the above manner not to be used for measurement since it has been captured from the same viewpoint position and with the same orientation, if the number of markers detected in the image is large, the image replaces a previous image that has been determined to be used, thereby updating the image.

Modification 1-5

In document 4, non-linear optimization is performed by placing a condition of constraint on markers using a priori knowledge of the markers. Since images are automatically obtained in the first embodiment, a geometric constraint condition cannot be placed on unknown markers in calculating the unknown markers. However, in the case that a geometric constraint condition is known in advance, such as in the case that the detected markers are coplanar, non-linear optimization may be performed by placing a geometric constraint condition.

Even in the case of unknown markers, non-linear optimization may be performed without placing a geometric constraint condition. Thereafter, a geometric constraint condition may be added by an operator using an input device, such as a mouse or a keyboard, and then non-linear optimization may be performed again.

Modification 1-6

An evaluation value shown below may be used to determine whether an image is to be used for calculating the marker placement information.

Images already determined to be used to calculate an unknown parameter are numbered frame numbers 1, 2, . . . , m−1, and it is then determined whether to use an obtained image as an m-th frame.

The obtained image is compared with the (m−1)-th frame. Among detected markers, an image with an overlapping portion greater than or equal to threshold T % is regarded as an m-th frame candidate.

Next, given a vector $\vec{A}$ extending from the position $C_{m-1}$, of the image pickup unit 100 at the time the image pickup unit 100 has captured the (m−1)-th frame to the barycentric position $G_{m-1}$ of a marker group detected in the (m−1)-th frame, a vector $\vec{B}$ extending from the position $C_m$ of the image pickup unit 100 at the time the image pickup unit 100 has captured the obtained image to the barycentric position $G_{m-1}$, and a vector $\vec{C}$ extending from the position $C_{m-1}$ to the position $C_m$ of the image pickup unit 100. If the following expression is satisfied, it is determined that the obtained image will be used for calculation:

$$\frac{\|\vec{A}\| \cdot \|\vec{B}\|}{\|\vec{C}\|} < D_{TH} \quad (1\text{-}31)$$

where $D_{th}$ is a preset threshold.

The accuracy of measurement using images, such as stereographic measurement, is affected by the distance to a measurement target and the distance between image capturing positions. Expression (1-31) takes into consideration the distance $\|\vec{A}\|$ between the position of the image pickup unit 100 at the time the image pickup unit 100 has captured the (m−1)-th frame and the barycentric position serving as the representative position of the markers, the distance $\|\vec{B}\|$ between the position of the image pickup unit 100 at the time the image pickup unit 100 has captured the obtained image and the barycentric position, and the distance $\|\vec{C}\|$ between the image capturing positions. That is, the shorter the distance to the marker representative value, the smaller the $\|\vec{A}\| \cdot \|\vec{B}\|$. The longer the base line, the greater the $\|\vec{C}\|$.

Thus, if expression (1-31) is satisfied, an image necessary for calculating the marker placement information can be determined.

Modification 1-7

In the first embodiment, in order to take into consideration the distance to each marker serving as a measurement target, the evaluation values are obtained on the basis of the barycentric position of the markers in the three-dimensional space, and it is then determined whether to use that image for calculating the marker placement information. In other words, the evaluation values are obtained on the basis of the vector extending from the position $C_{m-1}$ of the image pickup unit 100 at the time the image pickup unit 100 has captured the (m−1)-th frame to the barycentric position $G_{m-1}$ of the marker group detected in the (m−1)-th frame and the vector extending from the position $C_m$ of the image pickup unit 100 at the time the image pickup unit 100 has captured the obtained image to the barycentric position $G_{m-1}$.

Instead of obtaining the barycentric position of the marker positions as the representative position of the markers, the representative position may be obtained on the visual axis representing the direction toward the center of the image capturing range of the image pickup unit 100. On the basis of the rough position of each of the detected markers in the three-dimensional space, the depth of each marker in the camera coordinate system is obtained, and the average depth of the markers is represented by $z_{mean}$. The representative position of the markers in the camera coordinate system is represented by $t_{am} = (0, 0, z_{mean})$. Since the rough position and orientation of the image pickup unit 100 can be obtained by the image-pickup-unit-position/orientation obtaining unit 1040, the representative position $t_{am}$ of the markers in the camera coordinate system is transformed into a position in the reference coordinate system.

The representative position subsequent to the coordinate transform is represented by $t'_{am}$. Instead of using the barycentric position serving as the representative position, which has been used in the first embodiment, $t'_{am}$ may be used as the representative position.

Second Exemplary Embodiment

In the first embodiment, it is determined whether to use an image for calculating placement information regarding each marker placed in an environment or on an object, and the calculation is performed.

In a second exemplary embodiment, an image to be used to calculate the orientation of an orientation sensor in the camera coordinate system is automatically determined, and the orientation of the orientation sensor mounted on an image pickup unit in the camera coordinate system is calculated.

The orientation sensor used in the second embodiment mainly includes a gyro sensor that detects the angular velocity in the directions of three axes and an acceleration sensor that detects the acceleration in the directions of three axes, and the orientation sensor measures the 3-DOF orientation on the basis of a combination of measured values of the angular velocity and the acceleration.

In general, the orientation sensor using the gyro sensor obtains the orientation by integrating angular velocity information output from the gyro sensor. Thus, the obtained orientation contains a drift error. However, by additionally using the acceleration sensor, the direction of the earth's gravitational force can be measured, and hence, highly accurate tilt angles can be measured.

In contrast, an absolute reference cannot be obtained regarding an azimuth serving as a rotation around the gravity axis, and the drift error cannot be corrected. Therefore, the measurement accuracy of the azimuth is lower than that of the tilt angles.

Figure 7:
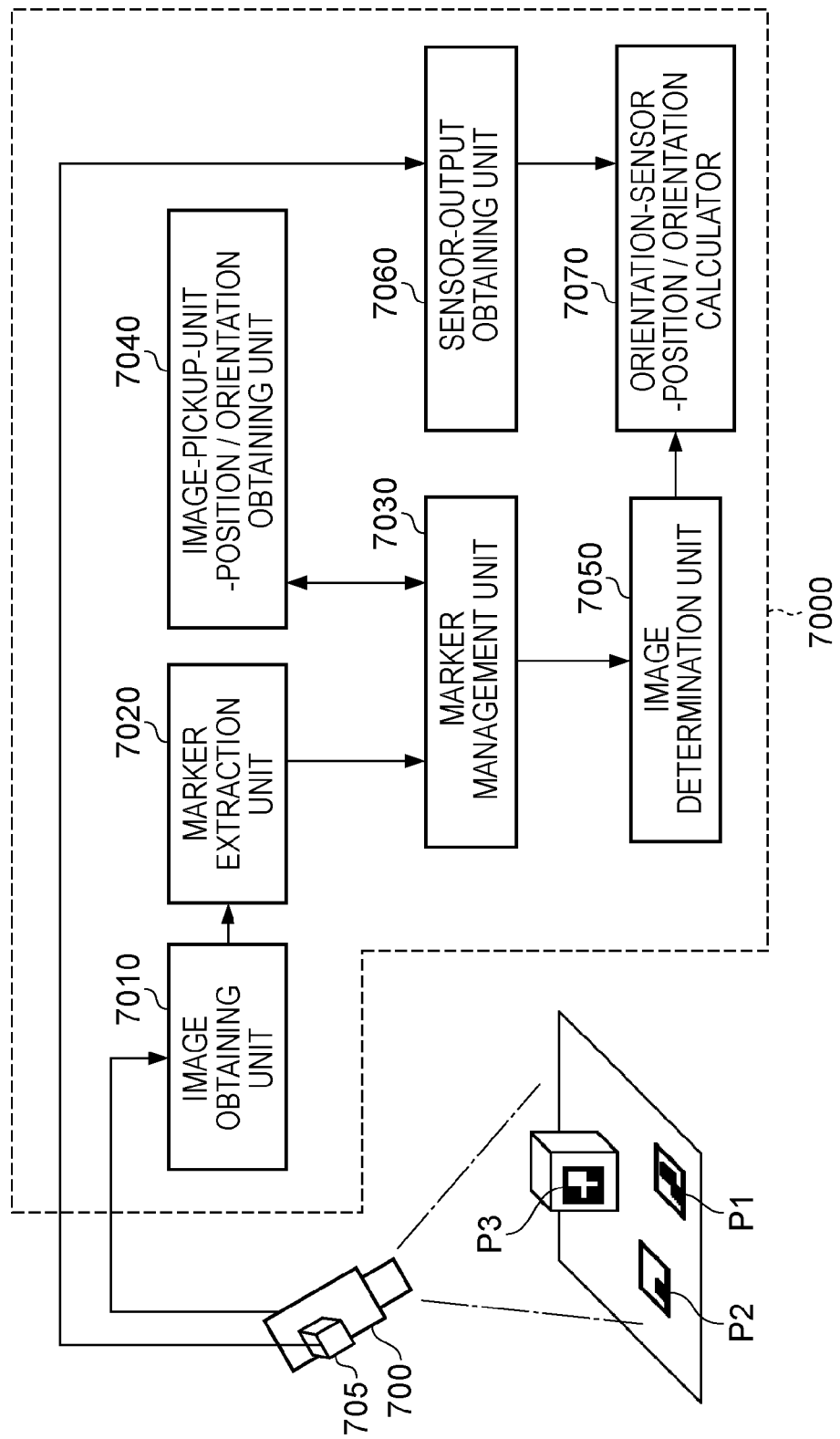
FIG. 7 is a schematic diagram of an exemplary structure of the information processing apparatus according to a second exemplary embodiment of the present invention.

FIG. 7 schematically shows an exemplary structure of an information processing apparatus 7000 according to the second embodiment.

An image pickup unit 700 is connected to the information processing apparatus 7000. The image pickup unit 700 captures an image of a space in which markers are placed and outputs the image to the information processing apparatus 7000. An orientation sensor 705 is mounted on the image pickup unit 700. At the same time as the image pickup unit 700 captures the image, a value measured by the orientation sensor 705 is output to the information processing apparatus 7000.

An image obtaining unit 7010 obtains the image from the image pickup unit 700.

A marker extraction unit 7020 extracts markers from the obtained image. A marker management unit 7030 manages, regarding the extracted markers, the identifier $k_n$ of each square marker $P^{kn}$, the image coordinates $u^{Pkni}$ of each vertex $p^{kni}$ of each marker $P^{kn}$, and placement information regarding each marker $P^{kn}$ as marker information.

An image-pickup-unit-position/orientation obtaining unit 7040 obtains the rough position and orientation of the image pickup unit 700 at the time the image pickup unit 700 has captured the image.

An image determination unit 7050 determines whether to use the image input via the image obtaining unit 7010 to calculate the orientation in the camera coordinate system of the orientation sensor 705 mounted on the image pickup unit 700.

At the same time as the image is captured, a sensor-output obtaining unit 7060 obtains the output of the orientation sensor 705.

Using an image determined by the image determination unit 7050 to be used, an orientation-sensor-position/orientation calculator 7070 calculates the orientation in the camera coordinate system of the orientation sensor 705 mounted on the image pickup unit 700.

Since the image obtaining unit 7010, the marker extraction unit 7020, the marker management unit 7030, and the image-pickup-unit-position/orientation obtaining unit 7040 are similar to the image obtaining unit 1010, the marker extraction unit 1020, the marker management unit 1030, and the image-pickup-unit-position/orientation obtaining unit 1040 described in the first embodiment, detailed descriptions thereof are omitted to avoid redundancy.

Figure 8:
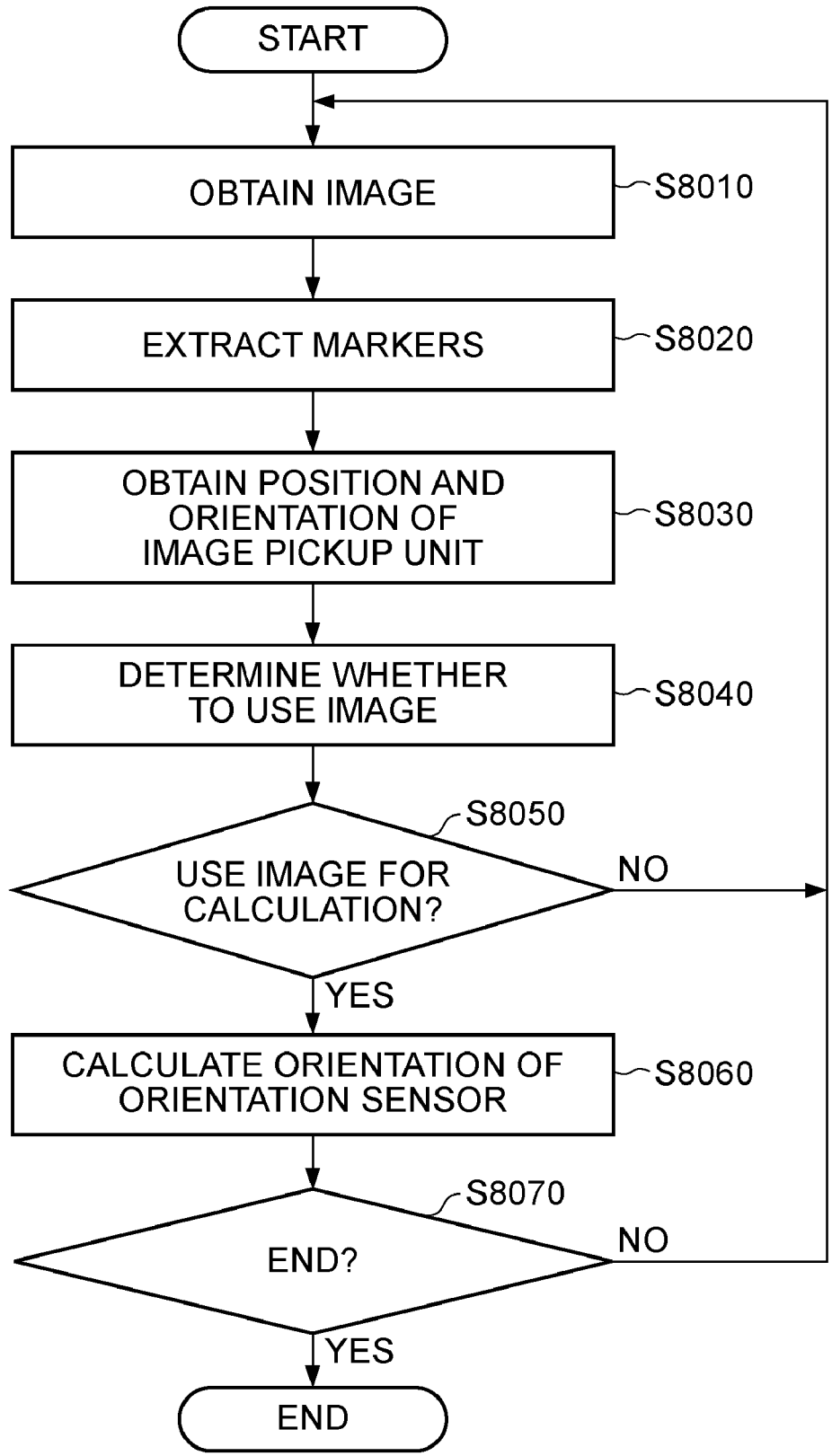
FIG. 8 is a flowchart of a process performed by the information processing apparatus according to the second embodiment.

FIG. 8 is a flowchart of a process of calculating placement information regarding the orientation sensor 705 in the second embodiment.

Since steps S8010 to S8030 are similar to steps S2010 to S2030 in the first embodiment, descriptions thereof are omitted to avoid redundancy.

In step S8040, it is determined whether to use an obtained image to calculate the orientation of the orientation sensor 705 in the camera coordinate system. Although the determination whether to use the obtained image can be made in a manner similar to that described in the first embodiment, in this case, the determination is made on the basis of the orientation of the image pickup unit 700 in the second embodiment. A detailed description of the method of determining an image to be used will be given below.

Figure 9:
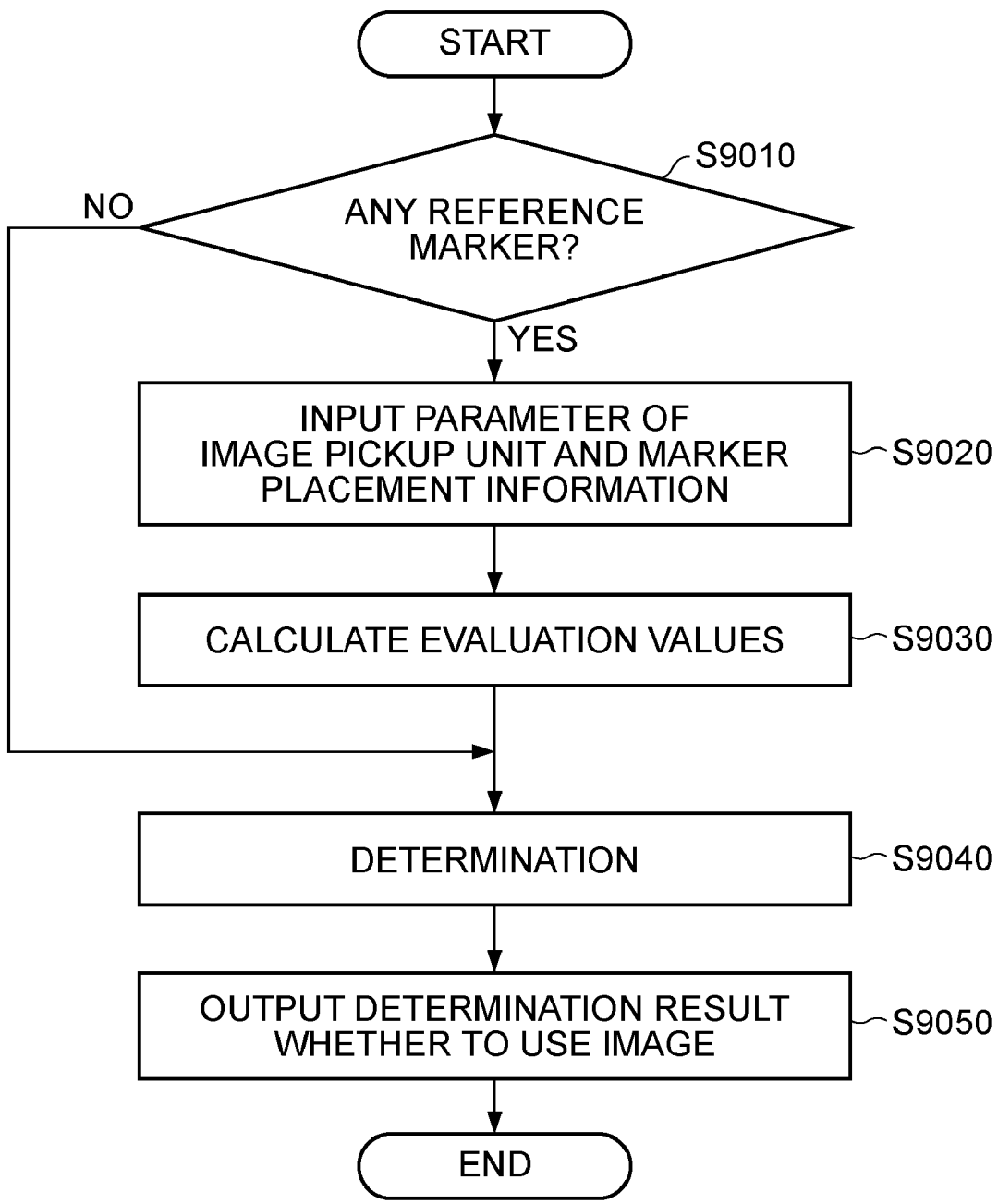
FIG. 9 is a flowchart of a process performed by the image determination unit according to the second embodiment.

FIG. 9 is a flowchart of a process of determining, in step S8040, whether to use the obtained image to calculate the orientation of the orientation sensor 705 in the camera coordinate system.

Since step S9010 is similar to step S3010 in the first embodiment, a description thereof is omitted to avoid redundancy.

In step S9020, the marker information managed by the marker management unit 7030 and the position and orientation of the image pickup unit 700, which are obtained by the image-pickup-unit-position/orientation obtaining unit 7040, are input to the image determination unit 7050.

In step S9030, evaluation values for determining whether to use the obtained image to calculate the orientation in the camera coordinate system of the orientation sensor 705 mounted on the image pickup unit 700 are calculated by the image determination unit 7050. A method of calculating the evaluation values will now be described below.

Images already determined to be used to calculate the orientation of the orientation sensor 705 are numbered frame numbers 1, 2, ..., m−1, and it is then determined whether to use the obtained image as an m-th frame.

The angular difference $\theta_{mj}$ between a visual axis vector $t_m$ of the image pickup unit 700 at the time the image pickup unit 700 has captured the obtained image and a visual axis vector $t_j$ at the time the image pickup unit 700 has captured the j-th frame (j=1, 2, ... m−1) already determined to be used is computed:

$$\theta_{mj} = \arccos \frac{\vec{t}_m \cdot \vec{t}_j}{|\vec{t}_m| \cdot |\vec{t}_j|}, \quad (j = 1, 2, \cdots J) \quad (2\text{-}1)$$

The obtained angular difference $\theta_{mj}$ (i=1, 2, ... J) serves as a first evaluation value.

Next, the rotation angular difference around the visual axis is obtained.

First, the visual axis vector $t_m$ in the reference coordinate system of the image pickup unit 700 at the time the image pickup unit 700 has captured the obtained image is obtained. Given a vector $t_z=[0\ 0\ -1]^t$ in the negative direction of the z-axis in the camera coordinate system, the visual axis vector $t_m$ is obtained on the basis of the rough orientation $R_m$ of the image pickup unit 700:

$$t_m = R_m \cdot t_z \quad (2\text{-}2)$$

Let a vector $v_m$ orthogonal to the visual axis vector $t_m$ of the image pickup unit 700 at the time the image pickup unit 700 has captured the obtained image be a vector $t_y=[0\ 1\ 0]^t$ in the y-axis direction in the camera coordinate system. The vector $v_m$ in the reference coordinate system is obtained on the basis of the rough orientation $R_m$ of the image pickup unit 700:

$$v_m = R_m \cdot t_y \quad (2\text{-}3)$$

Similarly, let a vector $v_j$ orthogonal to the visual axis vector in the j-th frame be a vector $t_y=[0\ 1\ 0]^t$ in the y-axis direction in the camera coordinate system. The vector $v_j$ is transformed by multiplying $t_y$ by the orientation $R_j$ of the image pickup unit 700 at the time the image pickup unit 700 has captured the j-th frame:

$$v_j = R_j \cdot t_y \quad (2\text{-}4)$$

The angular difference between $v_m$ and $v_j$, that is, the rotation angular difference $\gamma_{mj}$ around the visual axis, is computed:

$$\gamma_{mj} = \arccos \frac{\vec{v}_m \cdot \vec{v}_j}{|\vec{v}_m| \cdot |\vec{v}_j|} \quad (2\text{-}5)$$

The rotation angular difference $\gamma_{mj}$ (j=1, 2, ..., J) around the visual axis serves as a second evaluation value.

In step S9040, it is determined on the basis of the obtained evaluation values whether to use the obtained image for calculation.

In the case that, for all images (j=1, 2, ... J) determined to be used, the first evaluation value $\theta_{mj}$ satisfies the following:

$$\theta_{mj} < \theta_{Tmj} (j=1, 2, \ldots, N) \quad (2\text{-}6)$$

then, it means that the obtained image has been captured from the direction of a viewpoint at which no image has been captured yet, and it is thus determined that the image will be used. In expression (2-6), $\theta_{Tmj}$ is a preset threshold.

In the case that expression (2-6) is not satisfied, there is a probability that the obtained image is captured with the same orientation. On the basis of the second evaluation value, it is determined whether to use the obtained image.

In the case that the second evaluation value γmj satisfies the following:

$$\gamma_{mj} > \gamma_{Tmj} \quad (2\text{-}7)$$

then, the obtained image has been captured from the same viewpoint direction, but the image has been captured by rotating the image pickup unit 700 around the visual axis. Thus, the image is determined to be used for calculation. In expression (2-7), $\gamma_{Tmj}$ is a preset threshold.

In the case that expression (2-7) is not satisfied, it is determined not to use the obtained image to calculate the orientation of the orientation sensor 705.

In step S9050, the result of determination obtained in step S9040 showing whether to use the image is output.

Referring back to FIG. 8, in step S8050, in the case that the image is determined in step S8040 to be used to calculate the orientation of the orientation sensor 705 and that the number m of images determined to be used is greater than or equal to two (m≧2), the flow proceeds to step S8060. In contrast, in the case that the image is determined in step S8040 not to be used, the flow returns to step S8010.

Next step S8060 in which the orientation of the orientation sensor 705 is calculated will be described in detail.

In step S8060, the orientation $\omega_{cs}$ in the camera coordinate system of the orientation sensor 705 mounted on the image pickup unit 700 is calculated using images captured at a plurality of viewpoint positions, which are determined by the image determination unit 7050 to be used.

The sensor-output obtaining unit 7060 obtains the sensor output value of the orientation sensor 705. The position of the image pickup unit 700, an azimuth drift correction value $\phi_\tau$, and $\omega_{cs}$ are obtained by non-linear optimization so as to minimize the error between the detected position of each marker in the image in the reference coordinate system and the calculated position of the marker in the image, which is calculated on the basis of the position of the image pickup unit 700, the sensor measurement value, the azimuth drift correction value, and $\omega_{cs}$.

Given a sensor output value $R_{ws\tau}$ of the orientation sensor 705 in a world coordinate system, a rotation matrix $\Delta R(\phi_\tau)$ (azimuth drift error correction value) for rotating the image pickup unit 700 by $\phi_\tau$ in the azimuth direction (around the gravity axis), and a 3×3 rotation matrix $R(\omega_{sc})$ determined by $\omega_{cs}$. A transform equation for transforming the reference coordinate system to the camera coordinate system is derived:

$$R_{WC\tau} = \Delta R(\phi_\tau) \cdot R_{WS_\tau} \cdot R(\omega_{SC}) \quad (2\text{-}8)$$

The orientation $\omega_{cs}$ of the orientation sensor 705 in the camera coordinate system is processed as a three-element vector $\omega_{cs} = [\xi\ \psi\ \zeta]^T$. The orientation $\omega_{cs}$ of the orientation sensor 705 in the camera coordinate system, the position $t_{WC\tau} = [x_{\tau}\ y_{\tau}\ z_{\tau}]^T$ of the image pickup unit 700 at a certain viewpoint position (represented by an identifier τ), and an "azimuth drift error correction value" $\phi_\tau$ of the sensor measurement value at the time the image has been captured are unknown. These unknown parameters are expressed as a 3+4L-dimensional state vector:

$$s[\omega_{SC}^T t_{WC1}^T \phi_1 \ldots t_{WC\tau}^T \phi_\tau \ldots t_{WCL}^T \phi_L]^T$$

where L is the total of images captured at different viewpoints.

An appropriate initial value is given to the state vector s. The initial value of the position $t_{WC\tau}$ of the image pickup unit 700 can be obtained by the image-pickup-unit-position/orientation obtaining unit 7040. The initial value of $\omega_{cs}$ can be obtained by a known method in which each parameter value representing $\omega_{cs}$ is interactively increased/decreased to adjust the value by trial and error. More specifically, a virtual object can be projected onto the image on the basis of the initial value of the position of the image pickup unit 700, $\omega_{cs}$, and the sensor output value. Thus, an operator adjusts the position using an input device, such as a keyboard, such that the coordinates of the projected virtual object are accurately registered with a corresponding real object. A geomagnetic sensor may be used to obtain the rough azimuth.

Another method of obtaining the initial value of $\omega_{cs}$ is disclosed in Japanese Patent Laid-Open No. 2003-203252 (corresponding to U.S. Pat. No. 7,095,424). A virtual object based on a preset orientation is displayed on a display. Next, an operator monitors and adjusts the orientation of an image pickup device such that the displayed virtual object has a correct positional relationship with a real space. Finally, the orientation of an orientation sensor in the reference coordinate system and the orientation of the orientation sensor in the camera coordinate system are calculated in accordance with an output of the orientation sensor at that time.

The initial value of $\omega_{\tau i}$ is calculated by a method described in Japanese Patent Laid-Open No. 2005-107248 (corresponding to U.S. Patent Application No. 2005/0068293) using the initial value of $\omega_{cs}$.

Marker information similar to that managed by the marker management unit 1030 described in the first embodiment is managed by the marker management unit 7030. Theoretical values of the image coordinates $u = [u_x, u_y]T$ of the vertices of all markers are calculated on the basis of the image coordinates of each vertex $p^{ki}$ of each quadrangular marker $P^k$, placement information and identifier of each quadrangular marker $P^k$, and the state vector s. In this case, the theoretical values of the image coordinates refer to the coordinates that should be observed in a captured image of the markers, which are calculated on the basis of the position and orientation of the image pickup unit 700 in the reference coordinate system and placement information regarding the markers in the reference coordinate system.

The orientation of the image pickup unit 700 in the reference coordinate system can be calculated on the basis of a coordinate transform from the orientation of the orientation sensor 705 in a sensor coordinate system to the orientation in the reference coordinate system, the orientation of the orientation sensor 705 in the sensor coordinate system (measured value of the orientation of the orientation sensor 705), the azimuth drift error correction value, and a coordinate transform ($\omega_{sc}$) from the orientation of the orientation sensor 705 to the orientation of the image pickup unit 700. Calculation of a theoretical estimate of a certain marker $u = [u_x, u_y]^T$ is expressed using the state vector s:

$$u = F(s) \quad (2\text{-}9)$$

where F is a function including a viewing transform from the reference coordinate system to the camera coordinate system and a perspective projection transform.

Regarding the vertices of all the markers, an error $\Delta u$ between the actual image coordinates of each marker $v=[v_x, v_y]^T$ and corresponding theoretical values of the image coordinates $u=[u_x, u_y]^T$ is calculated:

$$\Delta u = v - u \quad (2\text{-}10)$$

The state vector s is optimized so as to minimize $\Delta u$. Using a vector $\Delta s$ for correcting the state vector s, $\Delta u$ can be expressed in the following manner by performing first-order approximation through Taylor expansion:

$$\Delta u \approx \left[\frac{\partial u}{\partial s}\right]\Delta s \quad (2\text{-}11)$$

In this case, $$J_{us} = \left[\frac{\partial u}{\partial s}\right]$$

where $J_{us}$ is a $2\times(3+4L)$ Jacobian matrix having, as each element, a partial differential coefficient obtained by partially differentiating u in equation (2-10) with respect to the state vector s.

Expression (2-11) is a relational expression regarding one of the vertices of L images to be used to calculate the orientation of the orientation sensor 705.

Given n markers extracted from the images determined to be used for calculation. The following expression holds true:

$$\begin{bmatrix} \Delta u_1 \\ \Delta u_2 \\ \vdots \\ \Delta u_n \end{bmatrix} \approx \begin{bmatrix} J_{us1} \\ J_{us2} \\ \vdots \\ J_{usn} \end{bmatrix} \Delta s \quad (2\text{-}12)$$

The unknown parameter $\Delta s$ to be calculated can be calculated by a least-squares method. Since this can be solved by a manner similar to that in the first embodiment, a repeated description thereof is omitted.

Since $\Delta s$ is a $(3+4L)$-dimensional vector, $\Delta s$ can be obtained by detecting at least one square marker in two captured images.

Using the corrected value $\Delta s$, the state vector s is corrected to obtain a new s:

$$s + \Delta s \rightarrow s \quad (2\text{-}13)$$

Using a determination reference, such as whether $\Sigma\Delta s$ is less than or equal to a preset threshold, or whether the corrected value $\Delta s$ is less than or equal to a preset threshold, it is determined whether the calculation has converged. If the calculation has not converged, the corrected state vector s serves as an initial value, and the calculation is repeated.

If it is determined that the calculation has converged, $\omega_{sc}$ included in the obtained state vector s is output. As a parameter indicating the latest azimuth drift error correction value, $\phi\tau$ can be additionally output.

Finally in step S8070, it is determined whether to end the calculation. When the operator gives an instruction to end the calculation, the flow ends. When the operator gives an instruction to continue the calculation (recalibration), an image is obtained again.

In the case that the virtual object rendered in the image using the obtained $\omega_{sc}$ and $\phi\tau$ is correctly registered with the real object, the operator ends the calculation. Otherwise, the operator determines to continue the calculation.

In the above manner, images appropriate to calculate the orientation of the orientation sensor 705, which is mounted on the image pickup unit 700, with respect to the image pickup unit 700 are automatically obtained, and placement information regarding the orientation sensor 705 can be highly accurately measured without depending on the user's knowledge and skills.

Third Exemplary Embodiment

In the first embodiment, the marker placement information or the position and orientation of the image pickup unit 100 are obtained as a measurement target. In the second embodiment, the orientation of the 3-DOF orientation sensor 705 in the camera coordinate system is obtained as a measurement target.

In a third exemplary embodiment, the position and orientation of a sensor coordinate system defined by a 6-DOF position/orientation sensor relative to the reference coordinate system and the position and orientation of the 6-DOF position/orientation sensor mounted on an image pickup unit relative to the image pickup unit are obtained as unknown parameters. In the third embodiment, the same markers as those described in the first and second embodiments are used.

Figure 10:
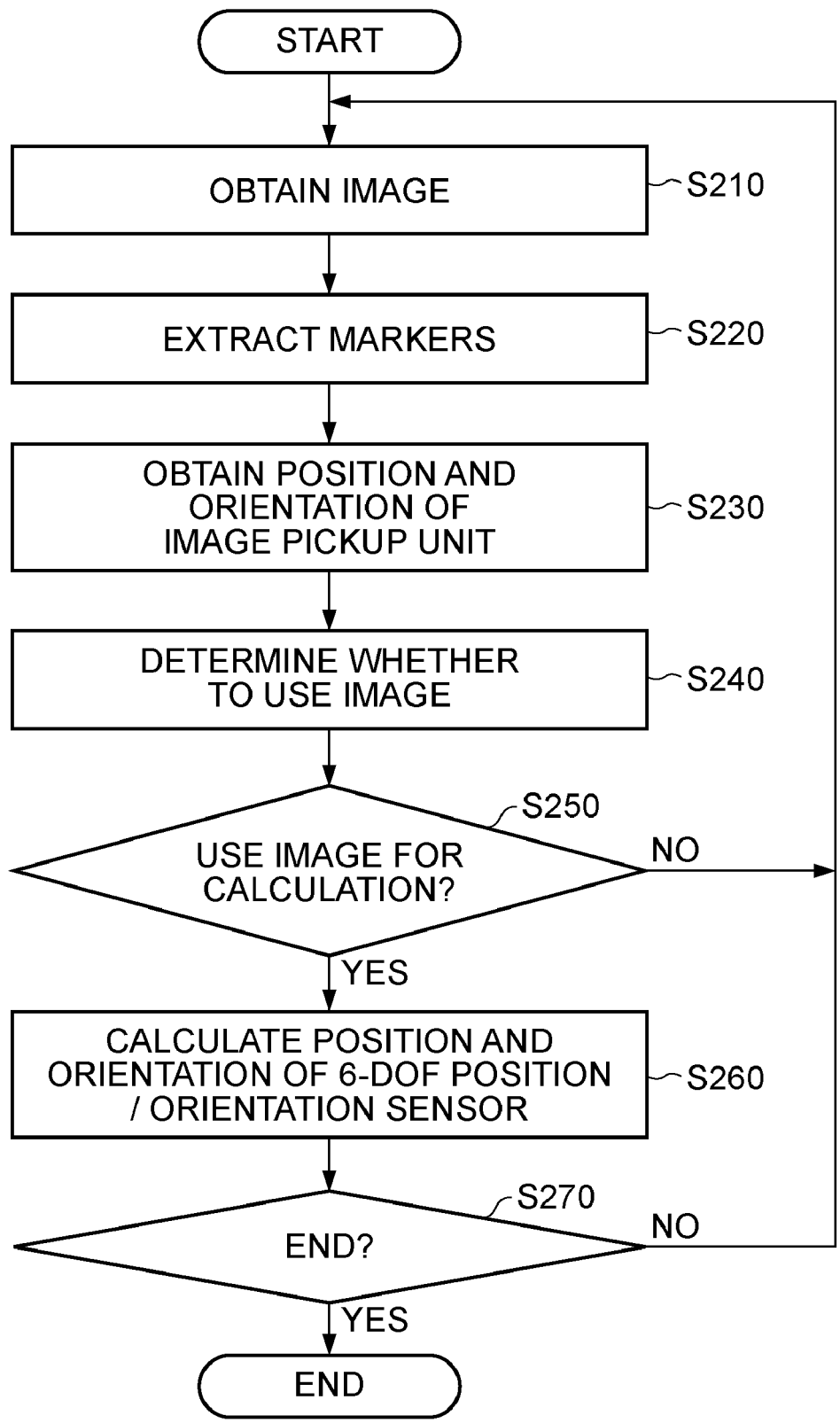
FIG. 10 is a flowchart of a process performed by the information processing apparatus according to a third exemplary embodiment of the present invention.

FIG. 10 is a flowchart of a process of calculating placement information regarding the 6-DOF position/orientation sensor according to the third embodiment.

Since steps S210 to S230 are similar to steps S2010 to S2030 in the first embodiment, descriptions thereof are omitted to avoid redundancy.

In step S240, an image determination unit determines whether to use an obtained image to calculate the unknown parameters. Since the determination method is similar to that described in the second embodiment, a description thereof is omitted to avoid redundancy. Alternatively, whether to use the image to calculate the unknown parameters may be determined in a manner similar to that described in the first embodiment.

In step S260, the unknown parameters are calculated.

In the third embodiment, the unknown parameters include a parameter $s_{WT}$ representing the position and orientation of the sensor coordinate system relative to the reference coordinate system and a parameter $s_{LT}$ representing the position and orientation of a receiver coordinate system of the 6-DOF sensor relative to the camera coordinate system.

Given the position of the sensor coordinate system in the reference coordinate system $t_{WT}=[t_{xWT}\ t_{yWT}\ t_{zWT}]^T$ and the orientation of the sensor coordinate system relative to the reference coordinate system $\omega^{WT}=[\omega^{xWT}\ \omega^{yWT}\ \omega_{zWT}]^T$. Then, $s_{WT}=[t_{xWT}\ t_{yWT}\ t_{zWT}\ \omega_{xWT}\ \omega_{yWT}\ \omega_{zWT}]^T$. Given the position of the receiver coordinate system of the 6-DOF sensor in the camera coordinate system $t_{LT}=[t_{xLT}\ t_{yLT}\ t_{zLT}]^T$ and the orientation of the receiver coordinate system of the 6-DOF sensor relative to the camera coordinate system $\omega_{LT}=[\omega_{xLT}\ \omega_{yLT}\ \omega_{zLT}]^T$. Then, $s_{LT}=[t_{xLT}\ t_{yLT}\ t_{zLT}\ \omega^{xLT}\ \omega_{yLT}\ \omega_{zLT}]^T$. Thus, the 12 unknown parameters are expressed as a state vector s:

$$s[t_{xWT}t_{yWT}t_{zWT}\omega_{xWT}\omega_{yWT}\omega_{zWT}t_{xLT}\\ t_{yLT}t_{zLT}\omega_{xLT}\omega_{yLT}\omega_{zLT}]^T$$

Appropriate initial values are given to the state vector s. For example, rough values measured manually by the user are input in advance.

Theoretical values of the image coordinates $u=[u_x, u_y]T$ of the vertices of all markers are calculated on the basis of the image coordinates of each vertex $p^{ki}$ of each quadrangular marker $P^k$, as in the first embodiment, placement information and identifier of each quadrangular marker $P^k$, and the state vector s. In this case, given a three-dimensional vector t representing the position of the origin of a three-dimensional coordinate system A relative to a certain three-dimensional coordinate system B, and a 3×3 rotation matrix R representing the orientation, then, the coordinates $x_B$ (three-dimensional vector) in the coordinate system B of a point represented by $x_A$ (three-dimensional vector) representing the position in the coordinate system A are expressed:

$$\begin{bmatrix} x_B \\ 1 \end{bmatrix} = \begin{bmatrix} R & t \\ 0 & 1 \end{bmatrix} \begin{bmatrix} x_A \\ 1 \end{bmatrix} \quad (3\text{-}1)$$

Suppose M collectively denotes R and t, and the following is derived:

$$M = \begin{bmatrix} R & t \\ 0 & 1 \end{bmatrix} \quad (3\text{-}2)$$

Figure 11:
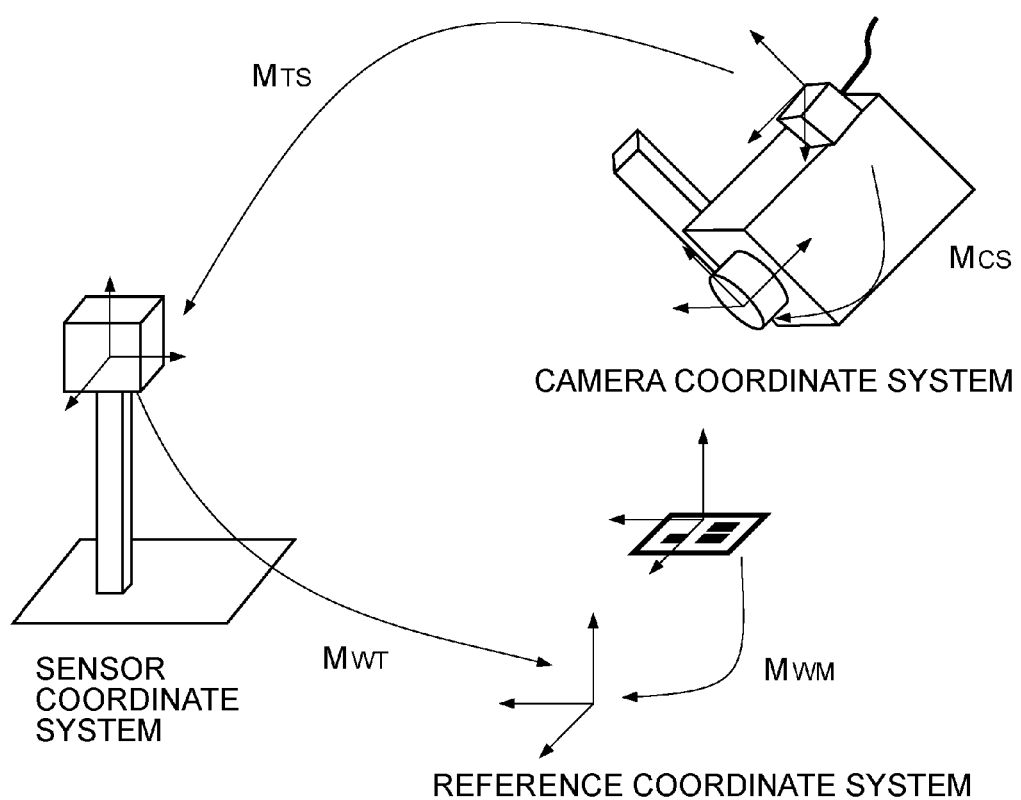
FIG. 11 illustrates transformation of a marker placed in a reference coordinate system to a camera coordinate system according to the third embodiment.

FIG. 11 illustrates a transform of a marker placed in the reference coordinate system to the camera coordinate system.

Let $M_{WT}$ be the position and orientation $s_{WT}$ of the sensor coordinate system of the 6-DOF position/orientation sensor in the reference coordinate system, $M_{TS}$ be the output value of the 6-DOF position/orientation sensor, $M_{CS}$ be the position and orientation $s_{LT}$ in the camera coordinate system of the 6-DOF position/orientation sensor mounted on the image pickup unit, and $M_{WM}$ be placement information regarding the marker in the reference coordinate system.

A matrix $M_{CM}$ for transforming the marker placed in the reference coordinate system to the camera coordinate system is:

$$M_{CM} = M_{CS} \cdot (M_{TS})^{-1} \cdot (M_{wT})^{-1} \cdot M_{wM} \quad (3\text{-}3)$$

Calculation of a theoretical estimate of a certain marker $u=[u_x, u_y]^T$ is expressed using the state vector s as:

$$u = F(s) \quad (3\text{-}4)$$

where F is a function including a viewing transform from the reference coordinate system to the camera coordinate system and a perspective projection transform.

A parameter that minimizes an error $\Delta u$ between the actual image coordinates of the marker $v=[v_x, v_y]^T$ and corresponding theoretical values of the image coordinates $u=[u_x, u_y]^T$ is calculated.

Using a vector $\Delta s$ for correcting the state vector s, $\Delta u$ can be expressed in the following manner by performing first-order approximation through Taylor expansion:

$$\Delta u \approx \left[ \frac{\partial u}{\partial s} \right] \Delta s \quad (3\text{-}5)$$

where $\left[ \frac{\partial u}{\partial s} \right]$ is a Jacobian matrix. Since the Jacobian matrix can be calculated by a known method, a description of a specific method of calculating the Jacobian matrix is omitted.

Given a Jacobian matrix $J_{us1}$ regarding a point in a certain image. Also, given n markers extracted from an image determined to be used to calculate the unknown parameter in expression (3-5). Then, the following expression is derived:

$$\begin{bmatrix} \Delta u_1 \\ \Delta u_2 \\ \vdots \\ \Delta u_n \end{bmatrix} \approx \begin{bmatrix} J_{us1} \\ J_{us2} \\ \vdots \\ J_{usn} \end{bmatrix} \Delta s \quad (3\text{-}6)$$

The unknown parameter $\Delta s$ to be obtained can be calculated by a least-squares method. Since this can be solved by a manner similar to those in the first and second embodiments, a repeated description thereof is omitted.

Using the corrected value $\Delta s$, the state vector s is corrected to obtain a new s:

$$s + \Delta s \to s \quad (3\text{-}7)$$

Using a determination reference, such as whether the error vector $\Delta s$ is less than or equal to a preset threshold, or whether the corrected value $\Delta s$ is less than or equal to a preset threshold, it is determined whether the calculation has converged. If the calculation has not converged, the corrected state vector s serves as an initial value, and the calculation is repeated.

If it is determined that the calculation has converged, the coordinate transform (position and orientation) of the sensor coordinate system of the 6-DOF sensor mounted on the image pickup unit in the reference coordinate system and the coordinate transform (position and orientation) of the receiver coordinate system of the 6-DOF sensor in the camera coordinate system are output.

In step S270, it is determined whether to end the calculation. When the operator gives an instruction to end the calculation, the flow ends. When the operator gives an instruction to continue the calculation (recalibration), an image is obtained again.

In the case that the virtual object rendered in the image using the obtained state vector s is correctly registered with the real object, the operator ends the calculation. Otherwise, the operator determines to continue the calculation.

In the above manner, highly accurate measurement can be performed without depending on the user's knowledge and skills by automatically determining and calculating images necessary to calculate the position and orientation of the sensor coordinate system defined by the 6-DOF position/orientation sensor relative to the reference coordinate system of the 6-DOF sensor, and the position and orientation of the receiver coordinate system of the 6-DOF sensor in the camera coordinate system.

Modification 3-1

In the first to third embodiments, the Newton-Raphson method has been used, which is an algorithm for finding the optimal solution by repeating a process of Taylor-expanding a non-linear function in optimization calculation and linearizing the result by first-order approximation to obtain a corrected value.

However, the corrected value may not necessarily be calculated by the Newton-Raphson method. For example, the corrected value may be obtained by the Levenberg-Marquardt method, which is a known iterative non-linear equation algorithm, or by a steepest descent method.

Alternatively, a robust estimation method, such as M estimation, which can stabilize the calculation by obtaining the solution while reducing effects of statistical outliers, may be employed.

Fourth Exemplary Embodiment

In the first to third embodiments, the methods of automatically determining images that are necessary to calculate unknown parameters using captured images of markers have been described.

In a fourth exemplary embodiment, the measurement is simplified by presenting to the user, through a display, an area or a path for moving the image pickup unit. In the first embodiment, it is determined whether to use an input image to calculate placement information regarding each marker.

In contrast, in the fourth embodiment, an image capturing area or an image capturing position and orientation determined to be used to calculate the marker placement information are calculated, and the position and orientation are presented to the user, thereby improving the input image itself.

Figure 12:
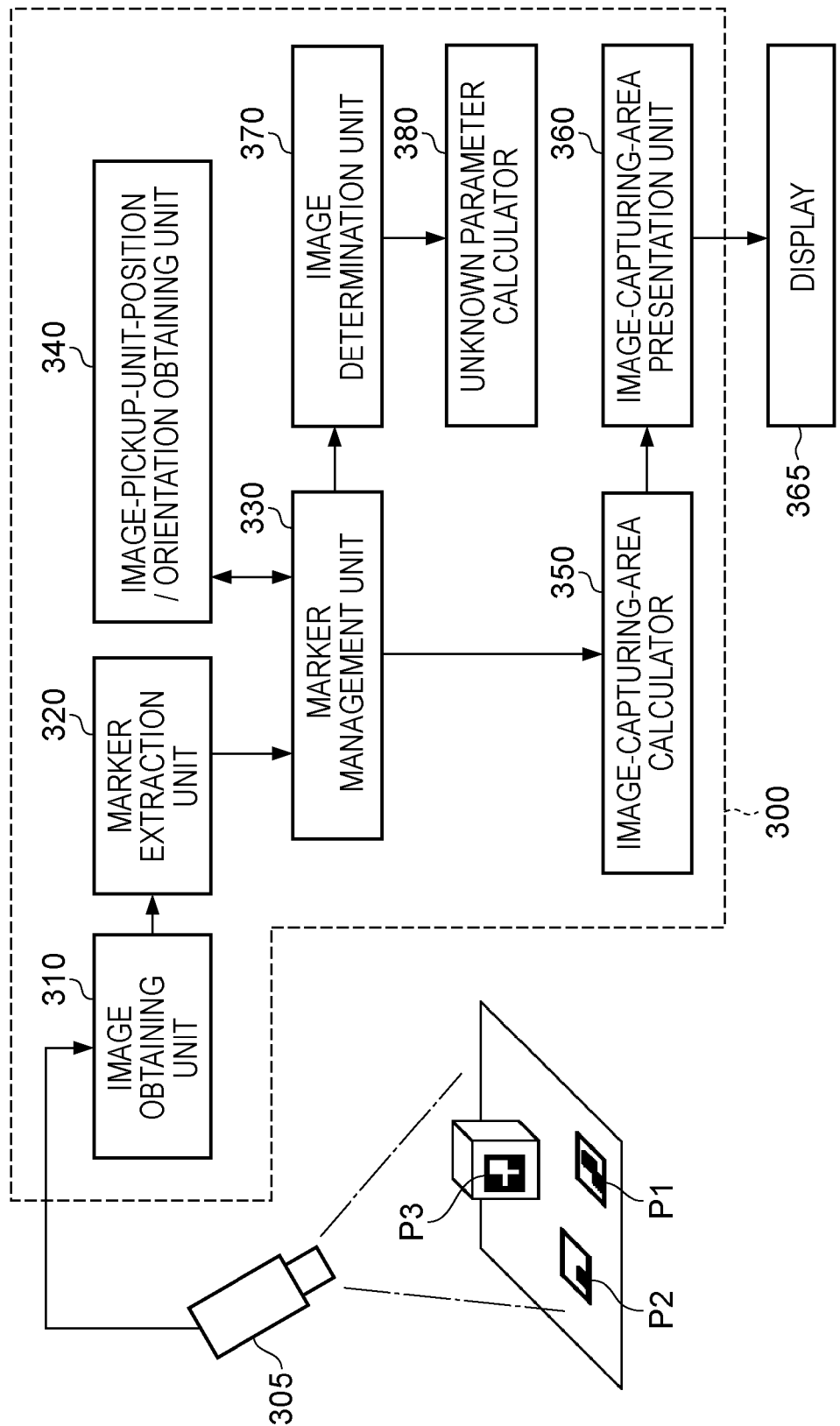
FIG. 12 is a schematic diagram of an exemplary structure of the information processing apparatus according to a fourth exemplary embodiment of the present invention.

FIG. 12 schematically shows an exemplary structure of an information processing apparatus 300 according to the third embodiment.

An image pickup unit 305 and a display 365 are connected to the information processing apparatus 300.

An image obtaining unit 310 obtains an image from the image pickup unit 305.

A marker extraction unit 320 extracts markers from the obtained image.

A marker management unit 330 manages, regarding the extracted markers, the identifier $k_n$ of each quadrangular marker $P^{kn}$, the image coordinates $u^{Pkni}$ of each vertex $p^{kni}$ of each marker $P^{kn}$, and placement information regarding each marker $P^{kn}$ as marker information.

An image-pickup-unit-position/orientation obtaining unit 340 obtains the rough position and orientation of the image pickup unit 305 at the time the image pickup unit 100 has captured the image.

An image-capturing-area calculator 350 calculates an area in which an image necessary for satisfactory measurement can be captured.

An image-capturing-area presentation unit 360 displays the area calculated by the image-capturing-area calculator 350 on the display 365, thereby presenting the area to the user.

An image determination unit 370 determines whether to use the obtained image to calculate placement information regarding each marker.

An unknown parameter calculator 380 calculates the marker placement information as an unknown parameter.

Since the image obtaining unit 310, the marker extraction unit 320, the marker management unit 330, and the image-pickup-unit-position/orientation obtaining unit 340 are similar to the image obtaining unit 1010, the marker extraction unit 1020, the marker management unit 1030, and the image-pickup-unit-position/orientation obtaining unit 1040 described in the first embodiment, descriptions thereof are omitted to avoid redundancy.

Figure 13:
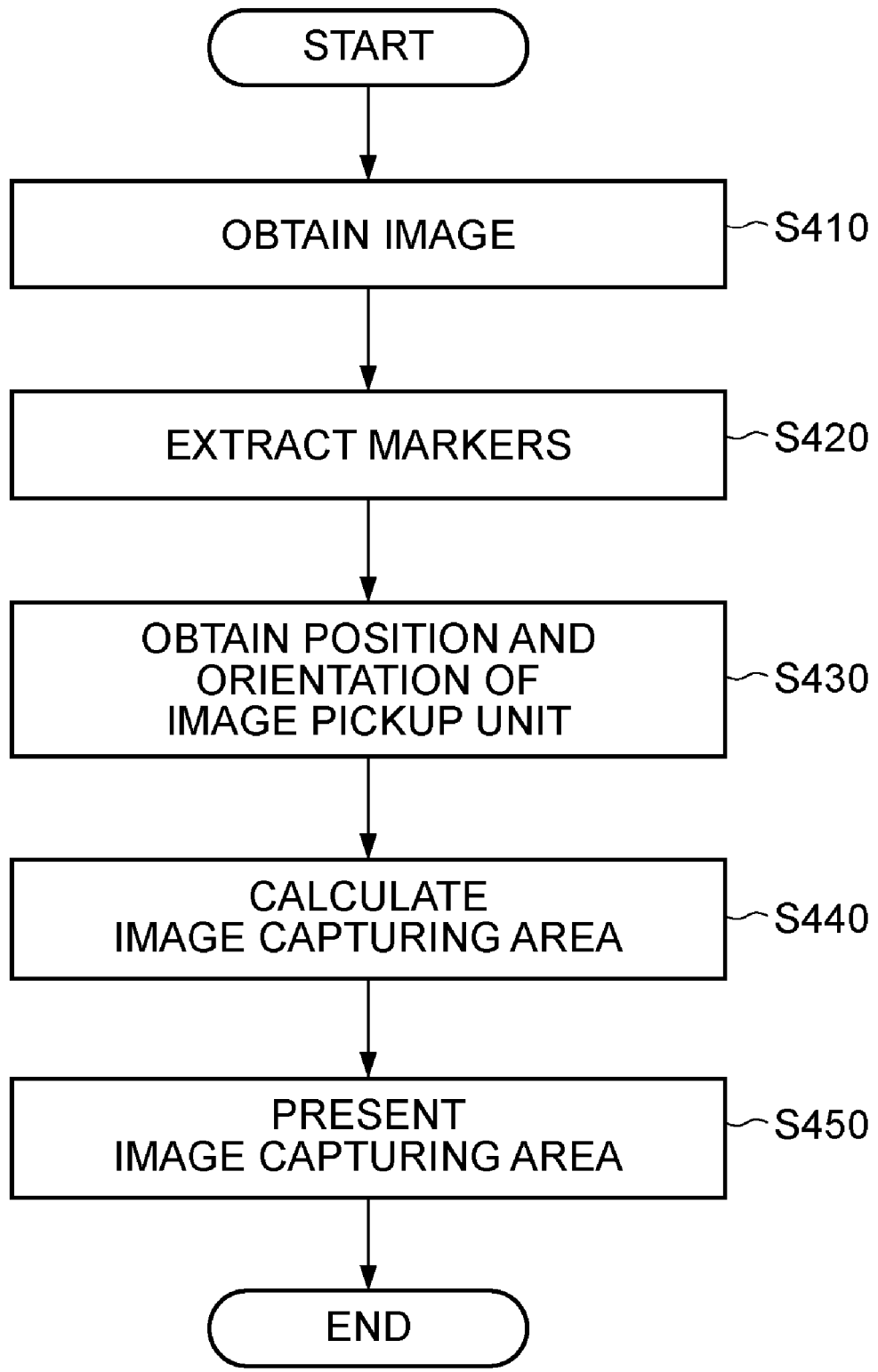
FIG. 13 is a flowchart of a process performed by the information processing apparatus according to the fourth embodiment.

FIG. 13 is a flowchart of a process according to the fourth embodiment.

Since steps S410 to S430 are similar to steps S2010 to S2030 in the first embodiment, descriptions thereof are omitted to avoid redundancy.

In step S440, an image capturing area is calculated. A method of calculating the image capturing area is described in detail using FIG. 14.

Figure 14:
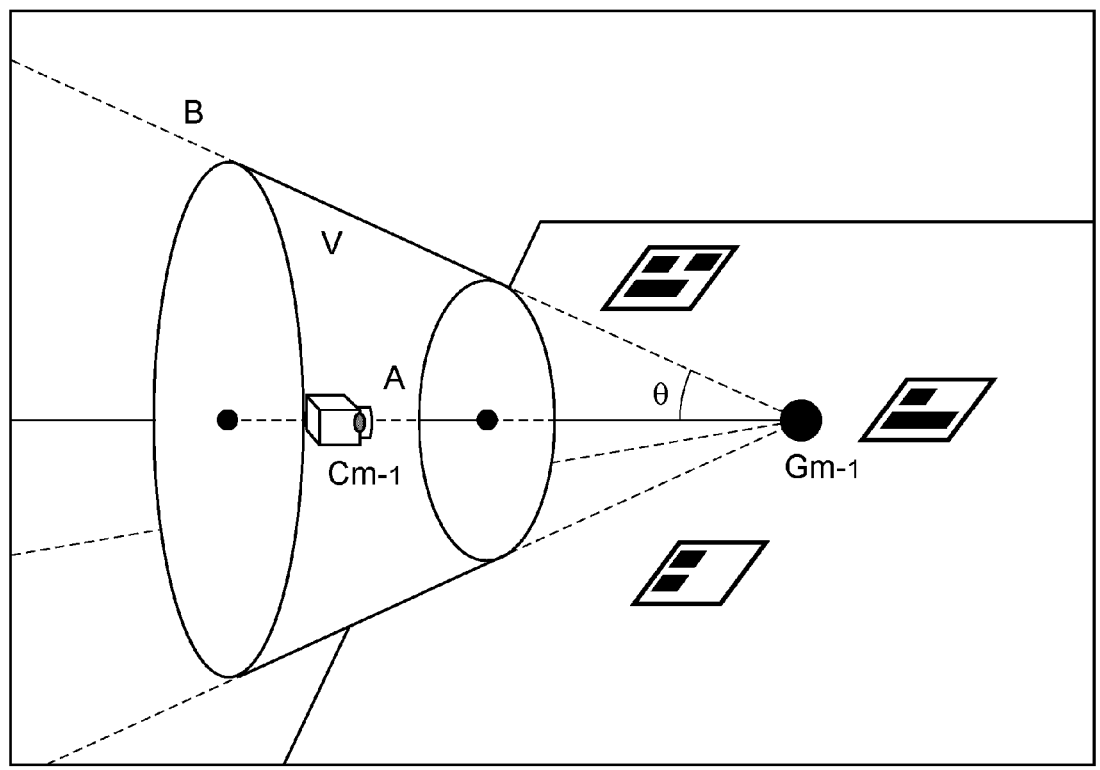
FIG. 14 illustrates an image capturing area according to the fourth embodiment.

FIG. 14 illustrates the method of calculating the image capturing area.

Images already determined to be used are numbered frame numbers 1, 2, . . . , m−1. In addition, given a vector $\vec{A}$ extending from the position $C_{m-1}$ of the image pickup unit 305 at the time the image pickup unit 305 has captured the (m−1)-th frame to the barycentric position $G_{m-1}$ of a marker group extracted from the (m−1)-th frame. Suppose that the barycentric position $G_{m-1}$ is a representative position of the target markers to be calculated. Next, given a vector $\vec{B}$ extending from the barycentric position $G_{m-1}$ subtending a threshold angle $\theta_{TAB}$ relative to the vector $\vec{A}$. Assume an area V that expands infinitely, which is formed by rotating $\vec{B}$ around $\vec{A}$ serving as a rotation axis. Let $\nabla$ be an area other than the area V. In the case that the image capturing position resides in the area $\nabla$, it means that the image has been captured at a viewpoint differing from that of the (m−1)-th frame, meaning that this is an area in which an image with a parallax that is sufficiently large to calculate the unknown parameters can be captured. Thus, the image capturing in the area $\nabla$ serves as the next image capturing area in which an image should be captured next.

Given vectors $\vec{B}_1$ and $\vec{B}_2$ with size ratios $a_1$ and $a_2$ relative to $\vec{A}$, respectively, which can be obtained as:

$$|\vec{B}_1|=\alpha_1|\vec{A}|$$

$$|\vec{B}_2|=\alpha_2|\vec{A}| \quad (4\text{-}1)$$

where $a_1<a_2$, and hence:

$$|\vec{B}_1|<|\vec{B}_2| \quad (4\text{-}2)$$

The area V is an area that expands infinitely. Alternatively, it is also meaningful to limit the area because, when an image is captured at a position closer to the representative position of the measurement targets than the viewpoint position at which the (m−1)-th frame has been captured, the accuracy of detecting the markers in the image is improved, thereby improving the measurement accuracy of the unknown parameters.

In contrast, in the case that an image is captured at a position farther away from the representative position of the measurement targets than the viewpoint position at which the (m−1)-th frame has been captured, the accuracy of detecting the markers in the image is degraded. However, the image capturing area is expanded, giving a possibility of detecting a new marker. Therefore, the area V is updated in the following manner.

First, assume an area $V_1$ is obtained by rotating $\vec{B}_1$ around $\vec{A}$ serving as a rotation axis, and an area $V_2$ is obtained by rotating $\vec{B}_2$ around $\vec{A}$ serving as a rotation axis. The area $V_2-V_1$ is updated as the area V. Assume an area $\nabla$ is an area other than the area V. In the case that the image capturing position resides in the area $\nabla$, it means that this serves as the next image capturing area in which an image should be captured next. From this point onward, $\nabla$ serves as the image capturing area.

Referring back to FIG. 13, in step S450, the image capturing area is presented to the user on the basis of the image capturing area calculated in step S440.

Figure 15A:
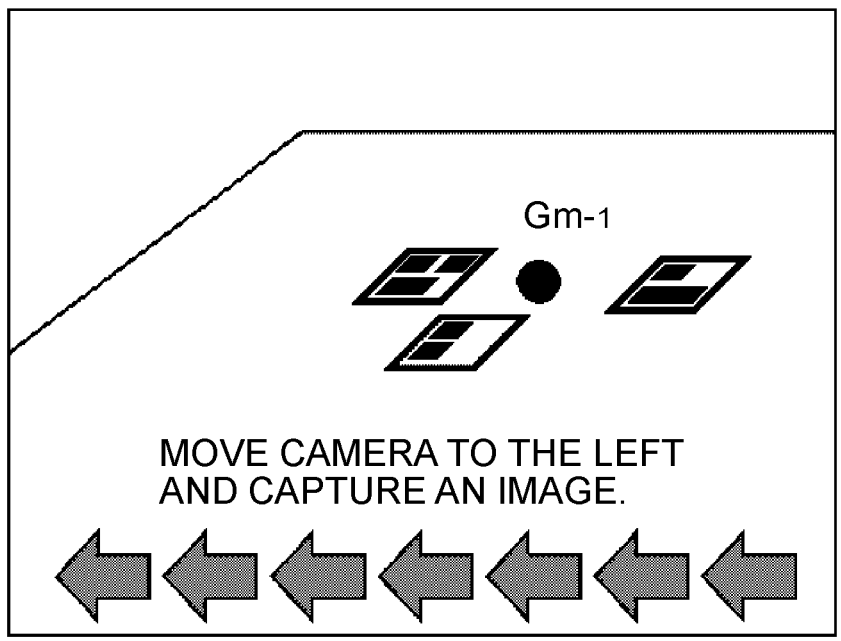
FIGS. 15A and 15B illustrate presentation of the image capturing area or the image pickup position and orientation according to the fourth embodiment.
Figure 15B:
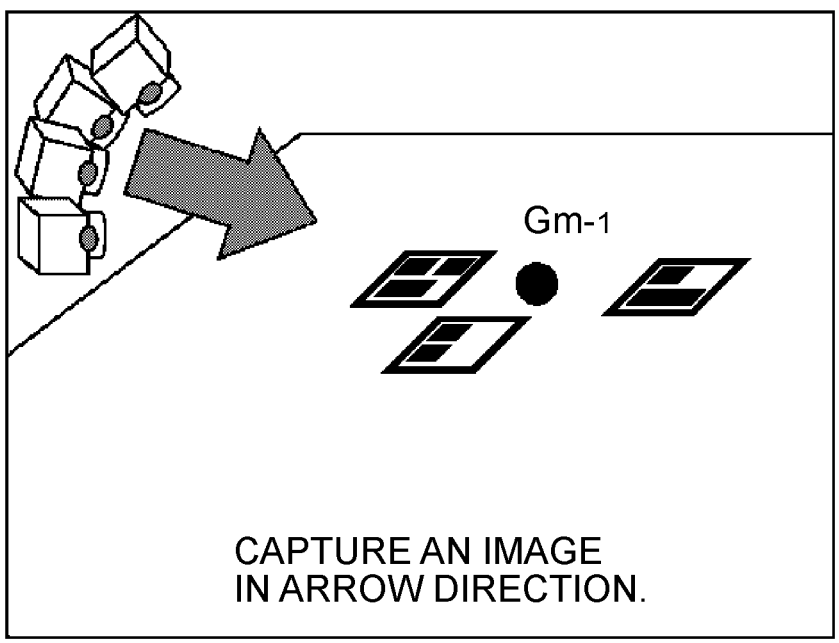

A method of presenting the image capturing area to the user will be described now. FIG. 15A illustrates an example in which the image capturing area is presented to the user.

The position and orientation of the image pickup unit 305 at the time the image pickup unit 305 has captured the obtained image have already been obtained by the image-pickup-unit-position/orientation obtaining unit 340. As shown in FIG. 15A, it is presented to the user using text and arrows to move the image pickup unit 305 to the nearest image capturing area $\nabla$.

The user watches and recognizes the presentation of this virtual image capturable area or the image capturing position and orientation of a virtual image pickup unit and confirms the position in the real space at which an image should be captured.

In the case that images sufficient for calculating the unknown parameter can be obtained because of the presentation in this manner, the unknown parameter can be calculated by the method described in the first embodiment.

Modification 4-1

In the fourth embodiment, an image capturing area to be captured next is calculated, and text and arrows prompting the user to move the image pickup unit 305 is presented to the user via the display 365. However, the presentation is not limited to the prompting text and arrows.

For example, the image capturing area itself shown in FIG. 14 or the next image capturing position and orientation of the image pickup unit 305 may be presented by rendering and superposing virtual CG images. As long as the next image capturing position and orientation or an image capturable area can be presented, the presentation method may employ pattern images, three-dimensional CG images displayed in lines, and characters.

Although the user is prompted to move the image pickup unit 305 to the nearest image capturing area $\nabla$ in the fourth embodiment, a motion vector from the (m−2)-th frame to the (m−1)-th frame may be calculated, and the user may be prompted to move the image pickup unit 305 to an image capturing area $\nabla$ close to the direction indicated by the motion vector.

Fifth Exemplary Embodiment

In the second embodiment, the method of automatically determining images necessary to calculate unknown parameters using captured images of markers has been described.

In a fifth exemplary embodiment, the measurement is simplified by presenting to the user, through a display, an area or a path for moving the image pickup unit. In the second embodiment, it is determined whether to use an image to calculate the orientation of the orientation sensor 705 mounted on the image pickup unit 700 in the camera coordinate system. In contrast, in the fifth embodiment, an image capturing area or an image capturing position and orientation determined to be used to calculate the orientation of the orientation sensor mounted on the image pickup unit in the camera coordinate system, which serves as an unknown parameter, is calculated, and the calculated result is presented to the user, thereby improving the input image itself.

Figure 16:
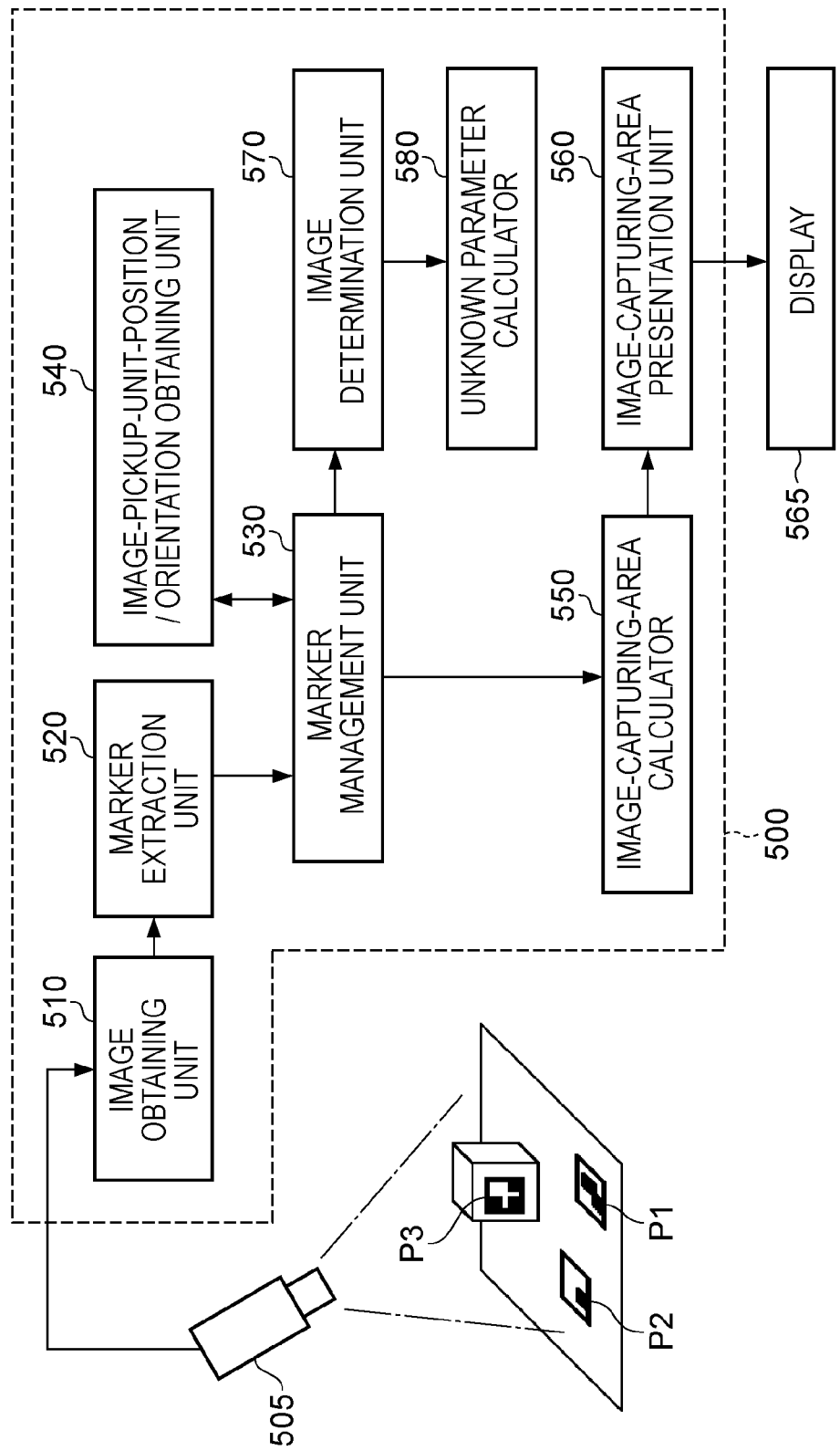
FIG. 16 is a schematic diagram of an exemplary structure of the information processing apparatus according to a fifth exemplary embodiment.

FIG. 16 schematically shows an exemplary structure of an information processing apparatus 500 according to the fifth embodiment.

An image pickup unit 505 and a display 565 are connected to the information processing apparatus 500.

An image obtaining unit 510 obtains an image from the image pickup unit 505.

A marker extraction unit 520 extracts markers from the obtained image.

A marker management unit 530 manages, regarding the extracted markers, the identifier $k_n$ of each quadrangular marker $P^{kn}$, the image coordinates $u^{Pkni}$ of each vertex $p^{kni}$ of marker $P^{kn}$, and placement information regarding each marker $P^{kn}$ as marker information.

An image-pickup-unit-position/orientation obtaining unit 540 obtains the rough position and orientation of the image pickup unit 505 at the time the image pickup unit 505 has captured the image.

An image-capturing-area calculator 550 calculates an area in which an image necessary for satisfactory measurement can be captured.

An image-capturing-area presentation unit 560 displays the area calculated by the image-capturing-area calculator 550 on the display 565, thereby presenting the area to the user.

An image determination unit 570 determines whether to use the obtained image to calculate the unknown parameter.

An unknown parameter calculator 580 calculates the orientation of an orientation sensor mounted on the image pickup unit 505 as the unknown parameter.

Since the image obtaining unit 510, the marker extraction unit 520, the marker management unit 530, and the image-pickup-unit-position/orientation obtaining unit 540 are similar to the image obtaining unit 7010, the marker extraction unit 7020, the marker management unit 7030, and the image-pickup-unit-position/orientation obtaining unit 7040 described in the second embodiment, descriptions thereof are omitted to avoid redundancy.

Figure 17:
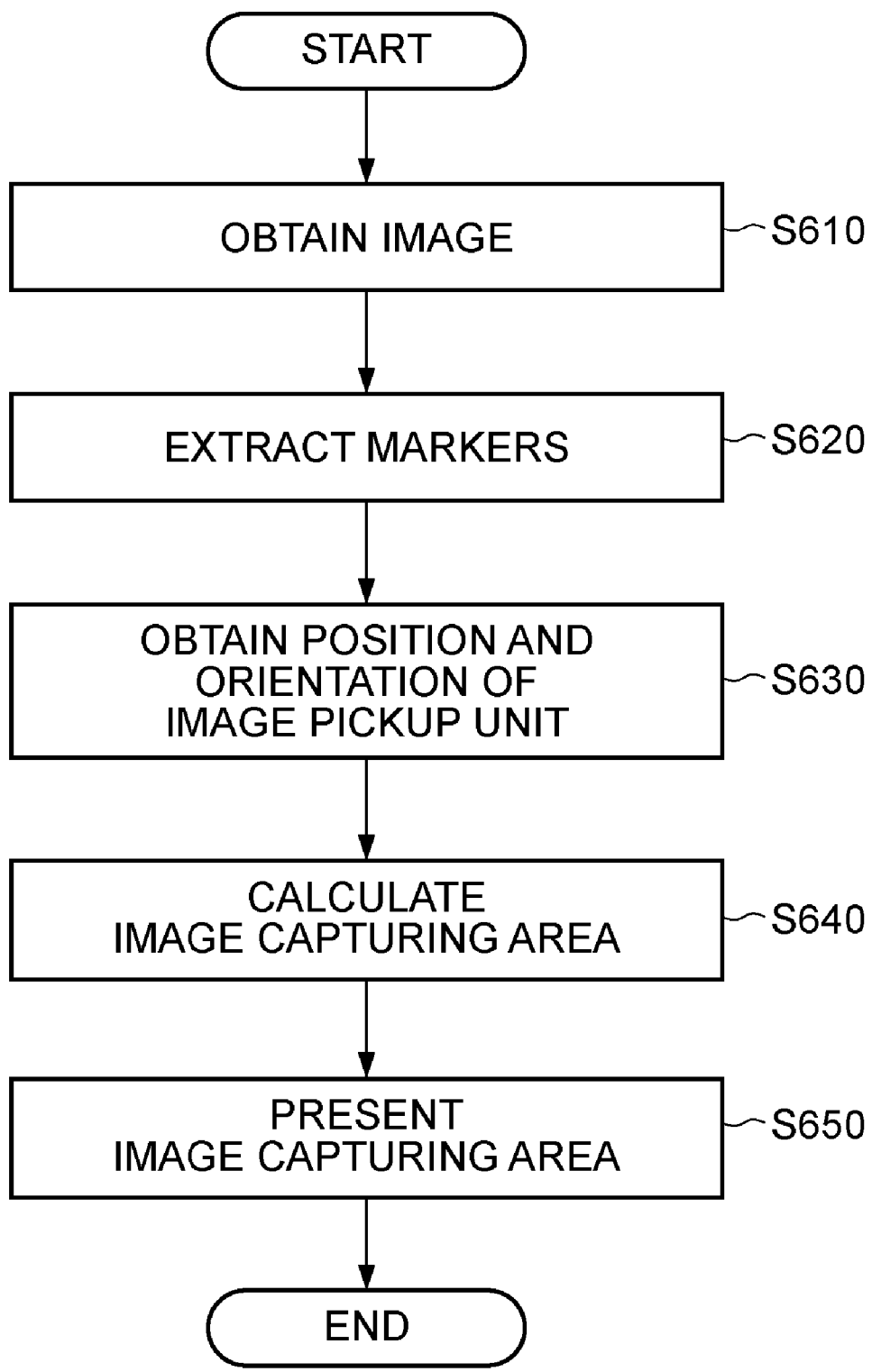
FIG. 17 is a flowchart of a process performed by the information processing apparatus according to the fifth embodiment.

FIG. 17 is a flowchart of a process according to the fifth embodiment.

Since steps S610 to S630 are similar to steps S8010 to S8030 in the second embodiment, descriptions thereof are omitted to avoid redundancy.

In step S640, an image capturing area is calculated. A method of calculating the image capturing area is described in detail below.

Images already determined to be used are numbered frame numbers 1, 2, ..., m−1. In addition, given a visual axis vector $t_j$ at the time the j-th frame (j=1, 2, ... m−1), which has already been determined to be used for calculation, has been captured. Assume a vector $\vec{A}_j$ is obtained by translating $t_j$ such that the viewpoint position of $t_j$ passes through the origin $A_0$ of an arbitrary coordinate system A'. Assume a vector $\vec{B}_j$ has an angular difference $\theta_{Tmj}$ relative to $\vec{A}_j$ regarding the origin $A_0$ of the coordinate system A', where the angular difference $\theta_{Tmj}$ is a preset threshold. Then, assume an area $V_j$ is obtained by rotating $\vec{B}_j$ around $\vec{A}_j$ serving as a rotation axis, and assume an area $\nabla_j$, which is an area other than the area V. In the case that the visual axis vector of the image pickup unit 505 translated in the coordinate system A' resides in the area $\nabla_j$, it means that an image can be captured at a viewpoint differing from that of the j-th frame. Thus, regarding all the j-th frames where j=1, 2, ..., m−1, an image capturing area in which the visual axis vector is contained in the area $\nabla_j$ serves as the next image capturing area in which an image should be captured next.

However, even in the case that the visual axis vector is contained in the area $V_j$, if the image pickup unit 505 is rotated around the visual axis, an image can be captured with a different orientation. Thus, this also serves as an image capturing area.

Among the frames where j=1, 2, ..., m−1, images in which the visual axis vector is contained in the area $V_j$ are all selected. Among the selected K images, a vector $v_k$ orthogonal to the visual axis vector of a k-th frame (k=1, 2, ..., K) is assumed as a vector $t_y=[0\ 1\ 0]^t$ in the y-axis direction in the camera coordinate system. From the orientation $R_k$ of the image pickup unit 505 at the time the image pickup unit 505 has captured the k-th frame, the following is derived:

$$V_K = R_j \cdot T_y \quad (5\text{-}1)$$

In the case that the orientation of the image pickup unit 505 has a visual-axis orthogonal vector $v_m$ with an angular difference greater than or equal to $Y_{Tmk}$ with respect to $v_k$ around the visual axis vector, it means that the image pickup unit 505 is rotated around the visual axis, and hence an image will be captured with a different orientation. Thus, this serves as the next image capturing area in which an image should be captured next.

Assume an area $W_k$ has a visual-axis orthogonal vector with an angular difference that is less than or equal to $Y_{Tmk}$, around the visual axis vector, with respect to the vector $v_k$ orthogonal to the visual axis vector, and assume an area $\overline{W}_k$ which is an area other than the area $W_k$. The image capturing position/orientation in the case that the visual axis vector resides in the area $V_j$ and the vector $v_m$ orthogonal to the visual axis vector resides in the area $\overline{W}_k$ serves as the next image capturing area in which an image should be captured next.

In step S650, the image capturing area is presented to the user on the basis of the image capturing area calculated in step S640.

Since a method of presenting the image capturing area to the user is similar to that in the fourth embodiment, a description thereof is omitted to avoid redundancy.

The user watches and recognizes the presentation of this virtual image capturable area or the image capturing position and orientation of a virtual image pickup unit and confirms the position in the real space at which an image should be captured.

In the case that images sufficient for calculating the unknown parameter can be obtained because of the presentation in this manner, the unknown parameter can be calculated by the method described in the second embodiment.

First Modification 5-1

In the fifth embodiment, the unknown parameter is the orientation of the orientation sensor mounted on the image pickup unit 505, and the capturing area of an image necessary to calculate the unknown parameter is presented. In the case that a 6-DOF sensor serves as a measurement target, a similar image-capturing-area calculation method can be employed to present an image capturing area to the user. As has been described in the third embodiment, the position and orientation of a receiver of the 6-DOF sensor mounted on the image pickup unit and the position and orientation of the 6-DOF sensor in the reference coordinate system can be calculated as unknown parameters.

Modification 5-2

In the first to fourth embodiments, images necessary for calculating the unknown parameters are automatically obtained. However, in the case that the operator determines the necessity of obtaining images, images may be obtained manually via an input device, such as a keyboard.

Sixth Exemplary Embodiment

An information processing apparatus according to a sixth exemplary embodiment enables a user to experience the MR while images necessary for calculating the unknown parameters described in the first to fifth embodiments are obtained online and the calculation results are reflected in the MR.

The information processing apparatus according to the sixth embodiment employs a video see-through head mounted display (HMD) to present capturing areas of images needed to calculate the unknown parameters.

The rough position and orientation of the image pickup unit at the time the image pickup unit has captured the obtained image are obtained by the image-pickup-unit-position/orientation obtaining unit described in the first to fifth embodiments. On the basis of the obtained rough position and orientation of the image pickup unit and the known internal parameters of the image pickup unit, a virtual object can be rendered and superposed on the obtained image.

In the case that the unknown parameters include the internal parameters of the image pickup unit, a virtual object is rendered and superposed using rough values of the internal parameters of the image pickup unit and the obtained rough position and orientation of the image pickup unit. Using a plurality of images determined to be used to calculate the unknown parameters, the other unknown parameters in the first to fourth embodiments are calculated, and then the unknown parameters that have been set as the rough values are calculated correctly. Accordingly, the virtual object can be correctly superposed on the real world.

Modification 6-1

In the sixth embodiment, the capturing areas of images necessary to calculate the unknown parameters are presented on the video see-through HMD.

However, a display for presenting information to the user is not limited to the video see-through HMD. For example, a cathode-ray tube (CRT) or a liquid crystal display (LCD) may be used, or an optical see-through HMD may be used.

Modification 6-2

The calculation of the unknown parameters in the first to fifth embodiments may be done separately from general calculation for enabling the user to experience the MR.

The former involves online determination of images necessary to calculate the unknown parameters in the first to fifth embodiments and calculation of the unknown parameters. The latter involves, to enable the user to experience the MR, general calculation of the position and orientation of the image pickup unit and CG rendering calculation.

The above calculations are divided into a plurality of threads, and the calculations are performed by a computer having a plurality of central processing unit (CPU) cores referred to as "multicores". Accordingly, the unknown parameters with relatively high calculation costs can be calculated, while the user is enabled to experience the MR in real time.

Seventh Exemplary Embodiment

In the second embodiment, for the purpose of calculating the orientation of the orientation sensor 705 mounted on the image pickup unit 700 in the camera coordinate system, images used to calculate the orientation are automatically determined on the basis of the position and orientation of the image pickup unit 700, which have been obtained by observing the markers.

In a seventh exemplary embodiment, images used to calculate the orientation of the orientation sensor in the camera coordinate system are automatically determined on the basis of the output value of the orientation sensor.

Figure 18:
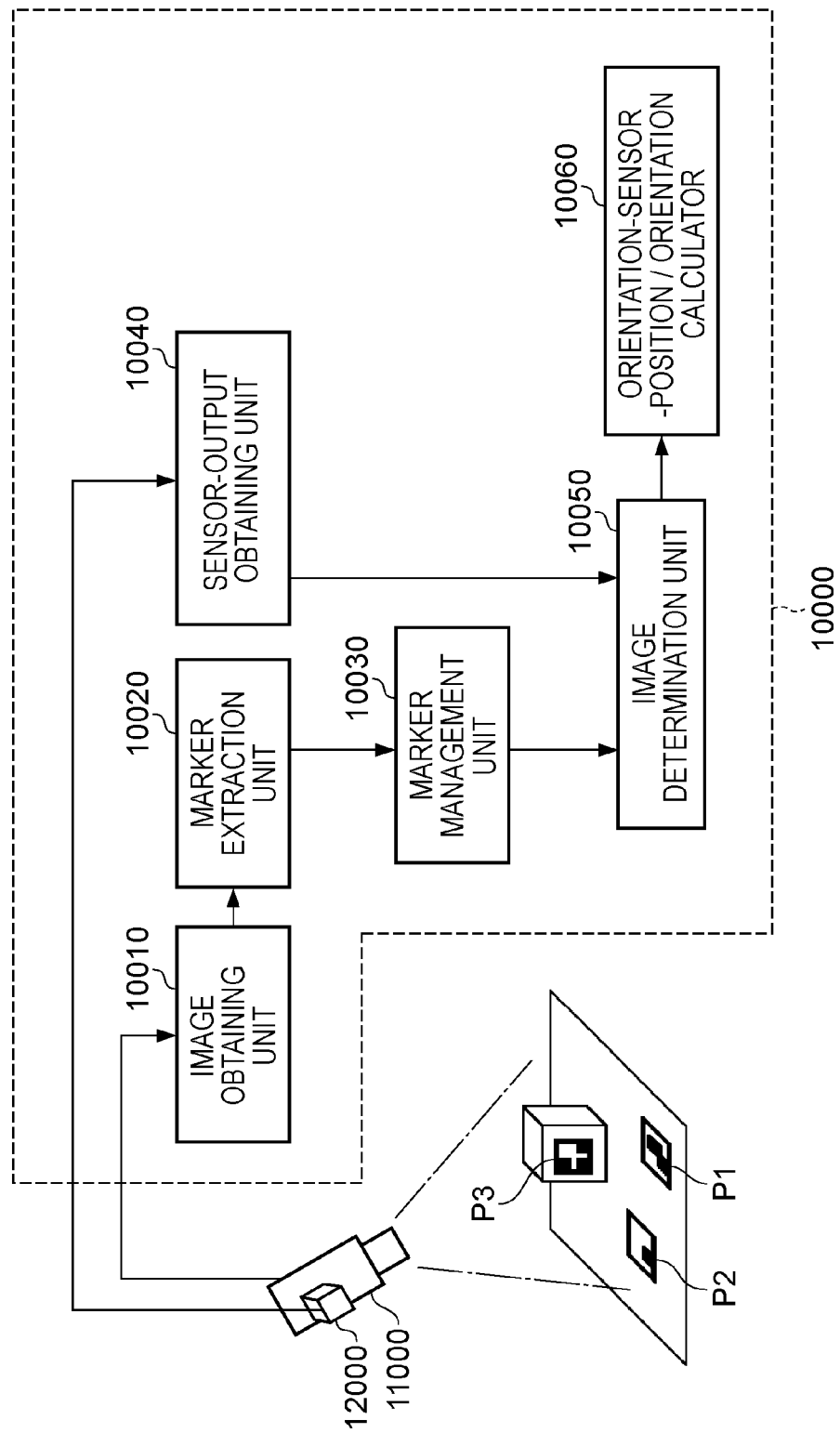
FIG. 18 is a schematic diagram of an exemplary structure of the information processing apparatus according to a seventh exemplary embodiment.

FIG. 18 schematically shows an exemplary structure of an information processing apparatus 10000 according to the seventh embodiment.

An image pickup unit 11000 is connected to the information processing apparatus 10000. The image pickup unit 11000 outputs an image of a space in which markers are placed to the information processing apparatus 10000. An orientation sensor 12000 is mounted on the image pickup unit 11000. At the same time as the image pickup unit 11000 captures the image, a value measured by the orientation sensor 12000 is output to the information processing apparatus 10000.

An image obtaining unit 10010 obtains the image from the image pickup unit 11000.

A marker extraction unit 10020 extracts the markers from the obtained image. A marker management unit 10030 manages, regarding the extracted markers, the identifier $k_n$ of each square marker $P^{kn}$, the image coordinates $u^{Pkni}$ of each vertex $p^{kni}$ of each marker $P^{kn}$, and placement information regarding each marker $P^{kn}$ as marker information.

A sensor-output obtaining unit 10040 obtains the sensor output value at the same time as the image is captured.

An image determination unit 10050 determines whether to use the image input via the image obtaining unit 10010 to calculate the orientation of the orientation sensor 12000 in the camera coordinate system.

Using images determined by the image determination unit 10050 to be used, an orientation-sensor-position/orientation calculator 10060 calculates the orientation of the orientation sensor 12000 in the camera coordinate system.

Since the image obtaining unit 10010, the marker extraction unit 10020, the marker management unit 10030, and the sensor-output obtaining unit 10040 are similar to the image obtaining unit 7010, the marker extraction unit 7020, the marker management unit 7030, and the sensor output obtaining unit 7060 described in the second embodiment, detailed descriptions thereof are omitted to avoid redundancy.

Figure 19:
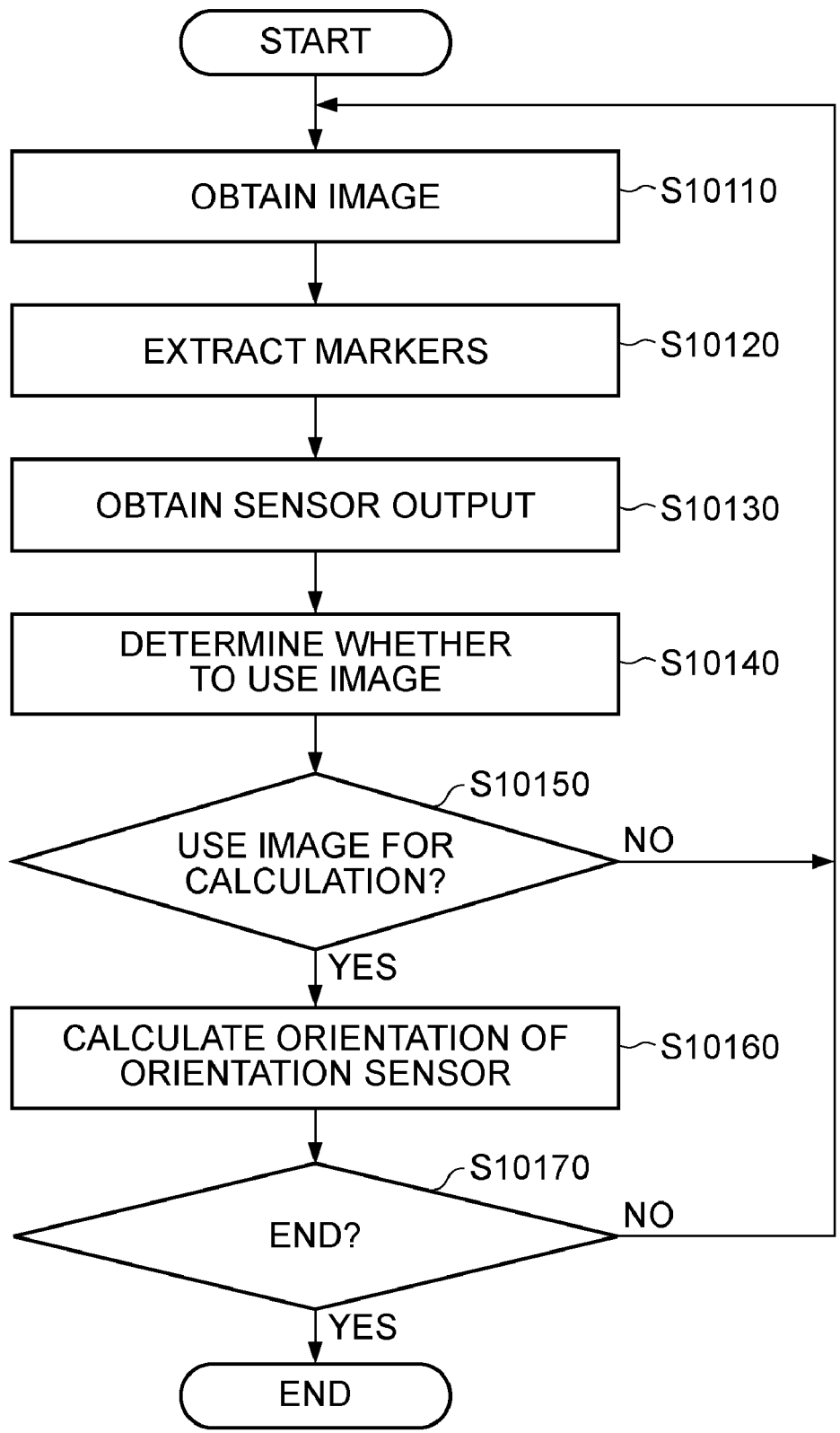
FIG. 19 is a flowchart of a process performed by the information processing apparatus according to the seventh embodiment.

FIG. 19 is a flowchart of a process of calculating placement information regarding the orientation sensor 12000 in the seventh embodiment relative to the camera coordinate system.

Since steps S10110 and S10120 are similar to steps S8010 to S8020 in the second embodiment, descriptions thereof are omitted to avoid redundancy.

In step S10130, the sensor-output obtaining unit 10040 obtains the sensor output value from the orientation sensor 12000.

In step S10140, the image determination unit 10050 determines whether to use the obtained image to calculate the orientation of the orientation sensor 12000 in the camera coordinate system on the basis of the sensor output value input in step S10130. The processing in step S10140 will be described in detail below.

Figure 20:
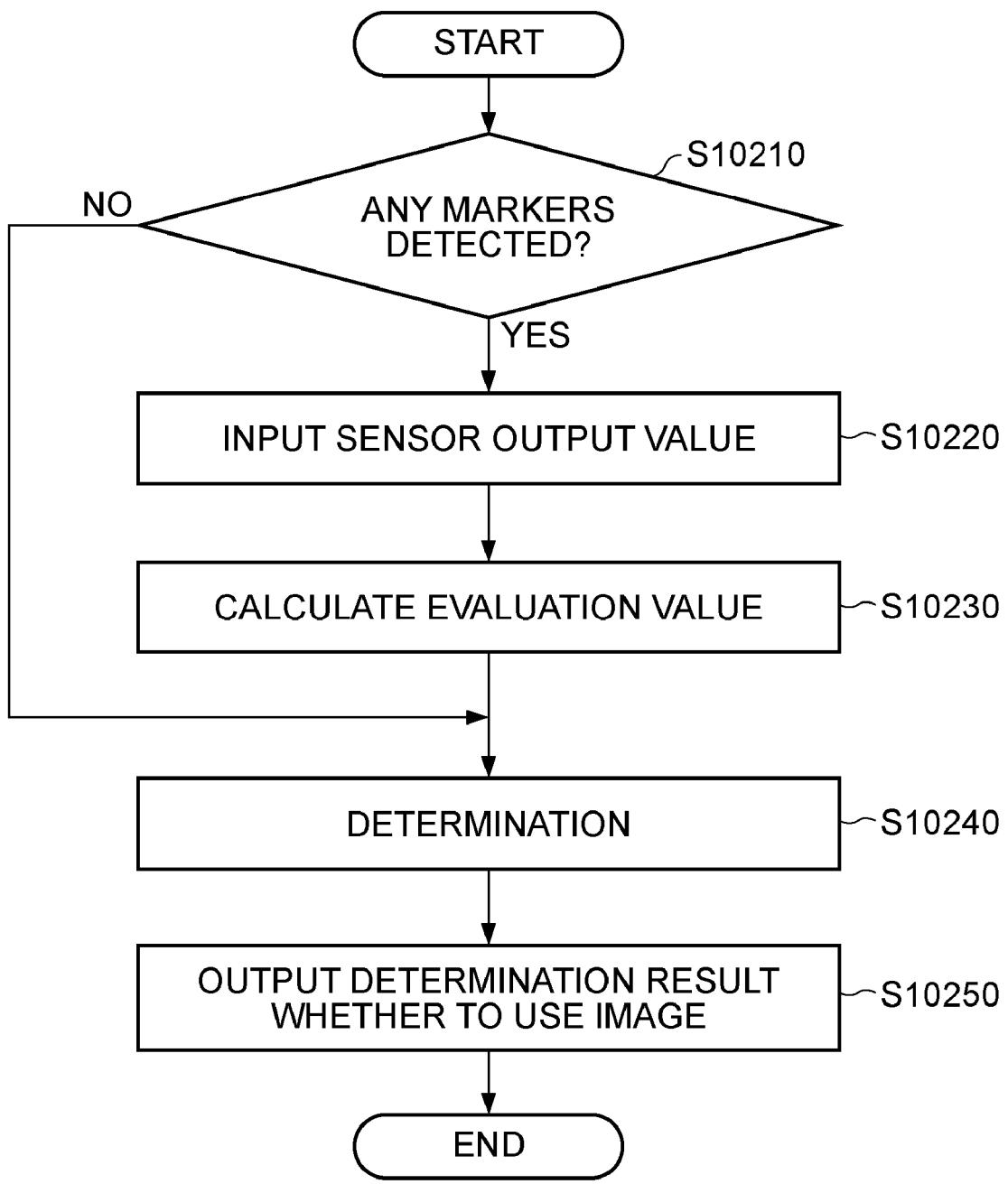
FIG. 20 is a flowchart of a process performed by the image determination unit according to the seventh embodiment.

FIG. 20 is a flowchart of a process of determining, in step S10140, whether to use the obtained image to calculate the orientation of the orientation sensor 12000 in the camera coordinate system.

In step S10210, it is determined whether markers have been detected in the input image. In the case that markers have been detected, the flow proceeds to step S10220. Otherwise, the flow proceeds to step S10240.

In step S10220, the sensor output value obtained by the sensor-output obtaining unit 10040 is input to the image determination unit 10050.

In step S10230, an evaluation value for determining whether to use the input image to calculate the orientation of the orientation sensor 12000 in the camera coordinate system is calculated.

In general, angle information obtained only by a gyro sensor represents a relative orientation change with respect to an orientation at a certain time. An orientation sensor including the gyro sensor measures the direction of the earth's gravitational force using an acceleration sensor, thereby obtaining absolute tilt angles (pitch angle and roll angle) with reference to the direction of the gravitational force. In contrast, an absolute reference cannot be obtained regarding an azimuth serving as a rotation around the gravity axis, and hence a drift error cannot be corrected. The measurement accuracy of the azimuth is lower than that of the tilt angles. Therefore, using the markers in the image, an azimuth (yaw angle) drift error correction value and the orientation of the orientation sensor 12000 relative to the image pickup unit 11000 are estimated. Whether to use the captured image for calculation is determined on whether or not the output value of the orientation sensor 12000 changes by an amount greater than a certain threshold, that is, whether or not the image has been captured with a sufficiently different orientation.

A method of calculating an evaluation value for determining whether the orientation is sufficiently different will be described below.

Images already determined to be used are numbered frame numbers 1, 2, ..., m−1, and the obtained image serves as an m-th frame.

Let us calculate the angular difference between a sensor measurement value $R_m$ at the time the image has been captured and a sensor measurement value $R_j$ at the time the j-th frame (j=1, 2, ..., m−1) already determined to be used has been captured. First, the difference between these two orientations is calculated, i.e., $\Delta R = R_m \cdot R_j^{-1}$. Then, $\Delta R$, which is a 3×3 rotation transform matrix, is transformed to Euler angles. The angular difference is expressed in terms of the Euler angles $\theta = [\alpha\ \beta\ \gamma]$ around the x-axis, y-axis, and z-axis:

$$R = R_{roll} \cdot R_{pitch} \cdot R_{yaw} \quad (7\text{-}1)$$

$$= \begin{bmatrix} \cos\gamma & -\sin\gamma & 0 \\ \sin\gamma & \cos\gamma & 0 \\ 0 & 0 & 1 \end{bmatrix} \begin{bmatrix} 1 & 0 & 0 \\ 0 & \cos\alpha & -\sin\alpha \\ 0 & \sin\alpha & \cos\alpha \end{bmatrix} \begin{bmatrix} \cos\beta & 0 & -\sin\beta \\ 0 & 1 & 0 \\ \sin\beta & 0 & \cos\beta \end{bmatrix}$$

Taking into consideration an azimuth drift in the orientation sensor 12000, the azimuth β regarded to contain a drift component is excluded, and only tilt angle components are extracted. More specifically, Euler angle representation $\theta' = [\alpha\ 0\ \gamma]$ containing only tilt angle components, in which the azimuth component of θ is set to zero, is obtained, and a rotation angle $\Delta\phi$ of the case in which the obtained θ' is transformed to rotation-axis rotation-angle representation is obtained. Thus, $\Delta\phi$ serves as an evaluation value.

In step S10240, whether to use the obtained image is determined on the basis of the obtained evaluation value. Regarding all images (j=1, 2, ..., J) that have already been determined to be used, in the case that:

$$\Delta\phi_{mj} > \phi_{threshold} \quad (7\text{-}2)$$

then, the obtained image is an image that has been captured with an orientation with which no image has been captured yet, and hence it is determined to use that image. In expression (7-2), $\phi_{threshold}$ is a preset threshold.

In step S10250, the determination result obtained in step S10240 is output to the orientation-sensor-position/orientation calculator 10060.

Referring back to FIG. 19, in step S10150, in the case that the image is determined in step S10140 to be used to calculate the orientation of the orientation sensor 12000, and that the number m of images that have been determined to be used is greater than or equal to two (m≧2), the flow proceeds to step S10160.

In contrast, in the case that the image is determined in step S10140 not to be used, the flow returns to step S10110.

In step S10160, using the images determined by the image determination unit 10050 to be used, which have been captured at a plurality of viewpoint positions, the orientation-sensor-position/orientation calculator 10060 calculates the orientation $\omega_{CS}$ of the orientation sensor 12000 in the camera coordinate system. The position of the image pickup unit 11000, an azimuth drift error correction value $\phi\tau$, and $\omega_{CS}$ are obtained by non-linear optimization so as to minimize the error between the calculated position of each marker in the image, which is calculated on the basis of the position of the orientation sensor 12000, the sensor measurement value, the azimuth drift error correction value ϕτ, and $\omega_{CS}$, and the detected position of each marker in the image. Since this deriving method is similar to step S8060 described in the second embodiment, a description thereof is omitted to avoid redundancy.

Finally in step S10170, it is determined whether to end the calculation. When the operator gives an instruction to end the calculation, the flow ends. When the operator gives an instruction to continue the calculation (recalibration), an image is obtained again. In the case that a virtual object rendered in the image using the obtained $\omega_{sc}$ and ϕτ is correctly registered with a corresponding real object, the operator ends the calculation. Otherwise, the operator determines to continue the calculation.

In the above manner, images appropriate to calculate the orientation of the orientation sensor 12000 mounted on the image pickup unit 11000 are automatically obtained, and placement information regarding the orientation sensor 12000 can be highly accurately measured without depending on the user's knowledge and skills.

Modification 7-1

In the seventh embodiment, the azimuth component is excluded when calculating the evaluation value for determining whether to use the image, and only the tilt angle components are used to conduct the determination. However, if the orientation sensor 12000 can perform measurement with relatively high accuracy such that the effect of the drift error can be ignored, the evaluation value may be calculated without excluding the azimuth component, and whether to use the image to calculate placement information regarding the orientation sensor 12000 mounted on the image pickup unit 11000 may be determined.

An unknown parameter in the case that the azimuth drift is ignored when calculating the placement information regarding the orientation sensor 12000 mounted on the image pickup unit 11000 will be described below.

Given a vector $l=(l_1, l_2, l_3)$ representing a vertical ascending direction (opposite to the earth's gravity) in the world coordinate system and an azimuth correction angle $\phi_{WT}$ representing an azimuth difference angle (rotation angle around the axis in the direction of gravitational force (gravity axis)) between the sensor coordinate system and the world coordinate system. In this case, the sensor coordinate system is a coordinate system defined by the sensor, and the sensor output value represents the orientation in the sensor coordinate system. Thus, a coordinate transform must be applied to the orientation of a measurement target in the sensor coordinate system to transform the orientation from the sensor coordinate system to the world coordinate system. This coordinate transform using the azimuth correction angle $\phi_{WT}$ may be performed using the method described in Japanese Patent Laid-Open No. 2005-107248, which has been applied by the assignee of the present invention.

The orientation $\omega_{CS}$ of the orientation sensor 12000 in the camera coordinate system is processed as a three-element vector $\omega_{CS}=[\xi \ \psi \xi]^T$. The orientation $\omega_{CS}$ of the orientation sensor 12000 in the camera coordinate system, the azimuth correction value $\phi_{WT}$, and the position of the image pickup unit 11000 at a certain viewpoint position (represented by the identifier τ) $t_{WC\tau}=[x_\tau \ y_\tau \ z_\tau]^T$ are unknown. These unknown parameters are expressed in a 4+3L-dimensional state vector form:

$$s=[\omega_{SC}^T \omega_{WT} t_{WC1}^T \ldots t_{WC\tau}^T \ldots t_{WCL}^T]^T$$

where L is the total of images captured at different viewpoints.

The unknown parameter s can be obtained in a manner similar to that described in the second embodiment.

Other Embodiments

The present invention may also be implemented by supplying a system or an apparatus with a storage medium (or a recording medium) having recorded thereon program code of software implementing the features of the above-described embodiments and allowing a computer (or a CPU or a microprocessing unit (MPU)) of the system or apparatus to read and execute the program code stored in the storage medium. In this case, the program code itself, which is read from the storage medium, implements the features of the above-described embodiments, and the storage medium having the program code stored thereon constitutes an embodiment of the present invention. The features of the above-described embodiments may be implemented not only by allowing the computer to read and execute the program code, but also by allowing an operating system (OS) running on the computer to execute, on the basis of instructions of the program code, part or entirety of the actual processing, thereby implementing the features of the above-described embodiments.

The program code read from the storage medium may be written into a memory included in a function expansion card installed in the computer or a function expansion unit connected to the computer, and a CPU or the like of the function expansion card or unit may perform part or entirety of the actual processing on the basis of instructions of the program code, thereby implementing the features of the foregoing embodiments.

In the case that the present invention is applied to the storage medium described above, the storage medium stores program code corresponding to the flowcharts described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Application No. 2006-173627 filed Jun. 23, 2006, which is hereby incorporated by reference herein in its entirety.

What is claimed is:

1. An information processing method of determining whether to calibrate information regarding a calibration target using images of markers existing in a real space captured by a movable image pickup unit, the method comprising the steps of:

obtaining a first image captured by the image pickup unit from a first viewpoint;

extracting markers from the first image;

obtaining a position of the first viewpoint;

calibrating the information regarding the calibration target using the markers extracted from the first image;

determining a representative position of the markers extracted from the first image based on placement information of the markers;

obtaining a second image captured by the image pickup unit from a second viewpoint after the image pickup unit has been moved from the first viewpoint to the second viewpoint such that the second viewpoint is different from the first viewpoint;

obtaining a position of the second viewpoint;

determining, on the basis of a positional relationship between the position of the first viewpoint, the representative position of the markers and the position of the second viewpoint, whether to calibrate the information regarding the calibration target using the second image; and calibrating the information regarding the calibration target using the second image in the case that it is determined to calibrate the information regarding the calibration target using the second image.

2. The information processing method according to claim 1, wherein the information regarding the calibration target includes at least one of the placement information regarding the markers, the orientation of the image pickup unit, a parameter of the image pickup unit, an orientation of an orientation sensor which is mounted on the image pickup unit in a camera coordinate system of the image pickup unit, and a position and orientation of a position and orientation sensor which is mounted on the image pickup unit in the camera coordinate system of the image pickup unit.

3. The information processing method according to claim 1, wherein the markers are identifiable markers.

4. The information processing method according to claim 1, wherein the representative position is a barycentric position of the markers extracted from the first image.

5. The information processing method according to claim 1, further comprising the steps of:

calculating, on the basis of the position information of the image pickup unit at the first viewpoint, area information regarding an image capturing area in which the second image should be captured; and presenting the calculated area information.

6. The information processing method according to claim 5, wherein an area subtending an angle greater than or equal to a predetermined angle relative to a straight line extending from a position represented by the position information of the image pickup unit at the first viewpoint to a representative position of the markers extracted from the captured image is calculated.

7. The information processing method according to claim 1, wherein the determining step includes:

calculating an evaluation value including a value of an angular difference between a vector given from the position of the first viewpoint to the representative position and a vector given from the position of the second viewpoint to the representative position; and determining to use the second image for calibrating the information regarding the calibration target, in the case that the evaluation value is more than a threshold value set in advance.

8. The information processing method according to claim 1, wherein the determining whether to calibrate further comprises:

calculating an evaluation value including a value of a magnitude ratio between a vector given from the position of the first viewpoint to the representative position and a vector given from the position of the second viewpoint to the representative position; and determining to use the second image for calibrating the information regarding the calibration target, in the case that the evaluation value is more than a threshold value set in advance.

9. The information processing method according to claim 1, wherein, in the step of determining the representative position based on placement information of the markers extracted from the first image, the markers are weighted in accordance with a result of the extracted markers.

10. The information processing method according to claim 1, wherein the representative position is on a visual axis of the image pickup unit.

11. The information processing method according to claim 1, wherein obtaining the position information of the image pickup unit at the first and second viewpoints by using a position and orientation sensor.

12. The information processing method according to claim 1, wherein obtaining the position information of the image pickup unit at the first and second viewpoints by using the placement information of the markers.

13. The information processing method according to claim 1, further comprising obtaining orientation information of the image pickup unit at the first and second viewpoints by using an orientation sensor mounted onto the image pickup unit, wherein the information regarding the calibration target includes an orientation of the orientation sensor in a camera coordinate system of the image pickup unit.

14. The information processing method according to claim 1, further comprising obtaining orientation information of the image pickup unit at the first and second viewpoints by using an orientation sensor mounted on the image pickup unit, wherein the information regarding the calibration target includes an orientation of the orientation sensor in a camera coordinate system of the image pickup unit.

15. The information processing method according to claim 1, further comprising obtaining orientation information of the image pickup unit at the first and second viewpoints by using a position and orientation sensor mounted on the image pickup unit, wherein the information regarding the calibration target includes an orientation of the orientation sensor in a reference coordinate system.

16. The information processing method according to claim 1, wherein the representative position is on a visual axis of the image pickup unit;

the method further comprising:

calculating an evaluation value including a value of an angular difference between a vector given from a visual axis of the image pickup unit at the first viewpoint and a vector given from a visual axis of the image pickup unit at the second viewpoint; and wherein, in the calibration determining step, the second image is determined for use in calibrating the information regarding the calibration target, in the case that the evaluation value is more than a threshold value set in advance.

17. The information processing method according to claim 1, further comprising:

obtaining orientation information of the image pickup unit at the first viewpoint, calibrating the information regarding the calibration target using the markers extracted from the first image and the obtained position and orientation information of the image pickup unit at the first viewpoint;

obtaining orientation information of the image pickup unit at the second viewpoint; and calibrating the information regarding the calibration target using the second image and the obtained position and orientation information of the image pickup unit at the first viewpoint, in the case that it is determined to calibrate the information regarding the calibration target using the second image.

18. An information processing apparatus for determining whether to calibrate information of a calibration target using images of markers existing in a real space captured by a movable image pickup unit, the apparatus comprising:

- a captured image obtaining unit configured to obtain a first image captured by the image pickup unit from a first viewpoint, and to obtain a second image captured by the image pickup unit from a second viewpoint;
- an extraction unit configured to extract markers from the first image, and to extract markers from the second image;
- an obtaining unit configured to obtain a position of the first viewpoint, and to obtain a position of the second viewpoint after the image pickup unit has been moved from the first viewpoint to the second viewpoint such that the second viewpoint is different from the first viewpoint;
- a representative position determination unit configured to calculate a representative position of the markers extracted from the first image based on placement information of the markers;
- a calibration determination unit configured to determine, on the basis of a positional relationship between the position of the first viewpoint, the representative position of the markers, and the position of the second viewpoint, whether to calibrate the information regarding the calibration target using the second image; and
- a calibration unit configured to calibrate the information regarding the calibration target using the markers extracted from the first image, and to calibrate the information regarding the calibration target using the second image in the case that the calibration determination unit determines to calibrate the information regarding the calibration target using the second image.

19. An information processing method of determining whether to calibrate information regarding a calibration target using images of markers existing in a real space captured by a movable image pickup unit, the method comprising the steps of:

- obtaining a first image captured by the image pickup unit from a first viewpoint with a first visual axis;
- extracting markers from the first image;
- obtaining an orientation of the first visual axis;
- calibrating the information regarding the calibration target using the markers extracted from the first image;
- obtaining a second image captured by the image pickup unit from the second viewpoint with a second visual axis after the image pickup unit has been moved from the first viewpoint to the second viewpoint such that the second viewpoint is different from the first viewpoint;
- obtaining an orientation of the second visual axis;
- determining, based on an orientational relationship between the orientation of the first visual axis and the orientation of the second visual axis, whether to calibrate the information regarding the calibration target using the second image; and
- calibrating the information regarding the calibration target using the second image in the case that it is determined to calibrate the information regarding the calibration target using the second image.

20. The information processing method according to claim 19, further comprising:

- calculating an angular difference between a vector given from a visual axis of the image pickup unit at the first viewpoint and a vector given from a visual axis of the image pickup unit at the second viewpoint, on the basis of the position and orientation of the image pickup nit at first viewpoint and the position and orientation of the image pickup unit at the second viewpoint;
- wherein, in the step of determining whether to calibrate, the second image is determined to use for calibrating the information regarding the calibration target, in the case that the angular difference is more than a threshold value set in advance.

21. An information processing apparatus for determining whether to calibrate information regarding a calibration target using images of markers existing in a real space captured by a movable image pickup unit, the apparatus comprising:

- a captured image obtaining unit configured to obtain a first image captured by the image pickup unit from a first viewpoint with a first visual axis, and to obtain a second image captured by the image pickup unit from a second viewpoint with a second visual axis;
- an extraction unit configured to extract markers from the first image, and to extract markers from the second image;
- an obtaining unit configured to obtain an orientation of the first visual axis, and to obtain an orientation of the second visual axis after the image pickup unit has been moved from the first viewpoint to the second viewpoint such that the second viewpoint is different from the first viewpoint;
- a determination unit configured to determine, based on an orientational relationship between the orientation of the first visual axis and the orientation of the second visual axis, whether to calibrate the information regarding the calibration target using the second image; and
- a calibration unit configured to calibrate the information regarding the calibration target using the markers extracted from the first image, and to calibrate the information regarding the calibration target using the second image in the case that the determination unit determines to calibrate the information regarding the calibration target using the second image.

22. A non-transitory computer-readable storage medium storing a program which causes a computer to execute an information processing method according to claim 1.

23. A non-transitory computer-readable storage medium storing a program which causes a computer to execute an information processing method according to claim 19.

* * * * *